(12) United States Patent
Khoreva et al.

(10) Patent No.: US 11,775,818 B2
(45) Date of Patent: Oct. 3, 2023

(54) TRAINING SYSTEM FOR TRAINING A GENERATOR NEURAL NETWORK

(71) Applicant: Robert Bosch GmbH, Stuttgart (DE)

(72) Inventors: Anna Khoreva, Stuttgart (DE); Dan Zhang, Leonberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 499 days.

(21) Appl. No.: 16/866,870

(22) Filed: May 5, 2020

(65) Prior Publication Data
US 2020/0364562 A1 Nov. 19, 2020

(30) Foreign Application Priority Data
May 14, 2019 (EP) .................................. 19174400

(51) Int. Cl.
| | | |
|---|---|---|
| G06K 9/62 | (2022.01) | |
| G06N 3/08 | (2023.01) | |
| G06N 20/20 | (2019.01) | |
| G06F 18/214 | (2023.01) | |
| G06N 3/045 | (2023.01) | |

(52) U.S. Cl.
CPC .............. G06N 3/08 (2013.01); G06F 18/214 (2023.01); G06N 3/045 (2023.01); G06N 20/20 (2019.01)

(58) Field of Classification Search
CPC ........ G06N 3/08; G06N 3/0454; G06N 20/20; G06N 3/0472; G06K 9/6256
See application file for complete search history.

(56) References Cited

U.S. PATENT DOCUMENTS

2019/0147320 A1* 5/2019 Mattyus ............... G06V 20/182
  382/155
2019/0171908 A1* 6/2019 Salavon ................. G06V 10/82

FOREIGN PATENT DOCUMENTS

WO WO 2020/205655 * 10/2020

OTHER PUBLICATIONS

Jun-Yan Zhu, "Unpaired Image-to-Image Translation using Cycle-Consistent Adversarial Networks", Proceedings of the IEEE international conference on computer vision. 2017.*
Li Na et al., "The Synthesis of Unpaired Underwater Images Using a Multistyle Generative Adversarial Network", IEEE Access, vol. 6, 2018, pp. 54241-54257, XP011692986.
Federico Fulgeri et al., "Can Adversarial Networks Hallucinate Occluded People With a Plausible Aspect?", arxiv. org, Cornell University Library, 201 Olin Library Cornell University Ithaca, NY 14853, 2019, pp. 1-13. XP081007423.
Rui Gong et al., "DLOW: Domain Flow for Adaptation and Generalization", arxiv. org, Cornell University Library, 201 Olin Library Cornell University Ithaca, NY 14853, 2019, pp. 1-17. XP080992636.

(Continued)

*Primary Examiner* — Samir A Ahmed
(74) *Attorney, Agent, or Firm* — NORTON ROSE FULBRIGHT US LLP; Gerard Messina

(57) ABSTRACT

A training system for training a generator neural network arranged to transform measured sensor data into generated sensor data. The generator network is arranged to receive as input sensor data and a transformation goal selected from a plurality of transformation goals and is arranged to transform the sensor data according to the transformation goal.

15 Claims, 10 Drawing Sheets

(56) References Cited

OTHER PUBLICATIONS

Choi Yunjey et al., "STARGAN: Unified Generative Adversarial Networks for Multi-Domain Image-to-Image Translation", 2018 IEEE/CVF Conference on Computer Vision and Pattern Recognition, IEEE, 2018, pp. 8789-8797, XP033473803.

Michal Uricar et al., "Yes, We Gan: Applying Adversarial Techniques for Autonomous Driving", arxiv.org, Cornell University Library, 201 Olin Library Cornell University Ithaca, NY 14853, 2020, pp. 1-16. XP081027239.

Jun-Yan Zhu et al., "Unpaired Image-to-Image Translation Using Cycle-Consistent Adversarial Networks", arxiv.org, Cornell University Library, 2018, pp. 1-18. ARXIV:1703.10593V6.

J. Johnson, et al., "Perceptual Losses for Real-Time Style Transfer and Super-Resolution", arxiv.org, Cornell University Library, 2016, pp. 1-18. ARXIV:1603.08155V1.

D. Kingma et al., "ADAM: A Method for Stochastic Optimization", arxiv.org, Cornell University Library, 2017, pp. 1-15. ARXIV:1412.6980V9.

* cited by examiner

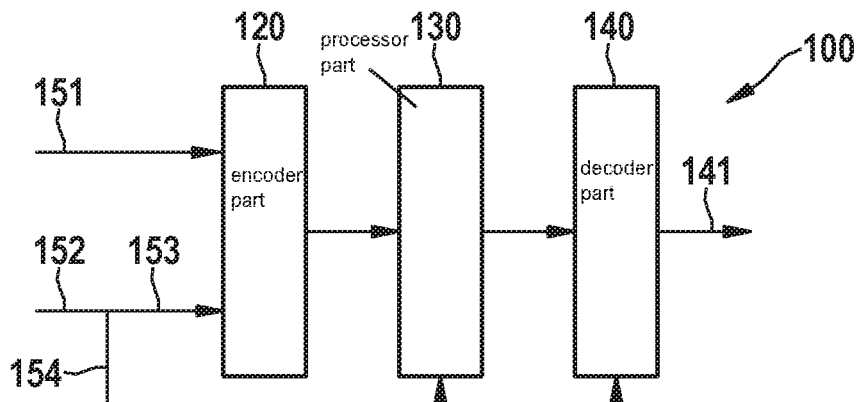
Fig. 1
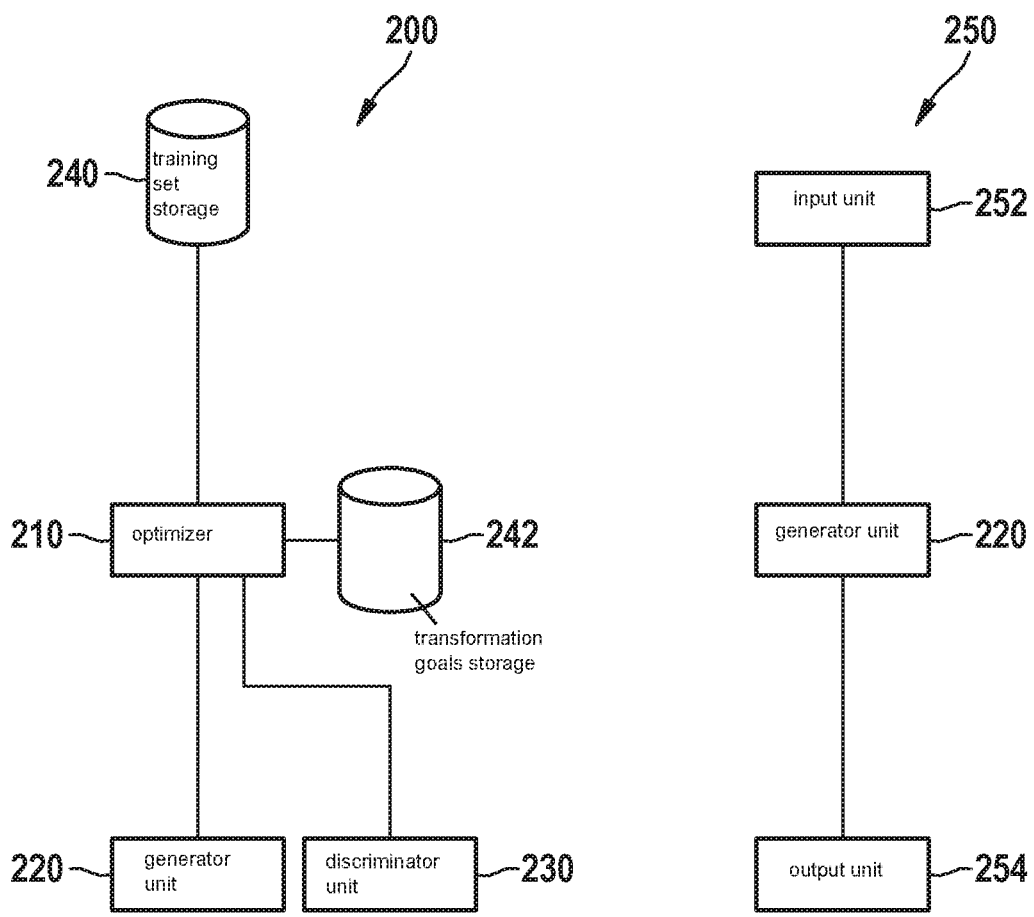
Fig. 2a
Fig. 2b

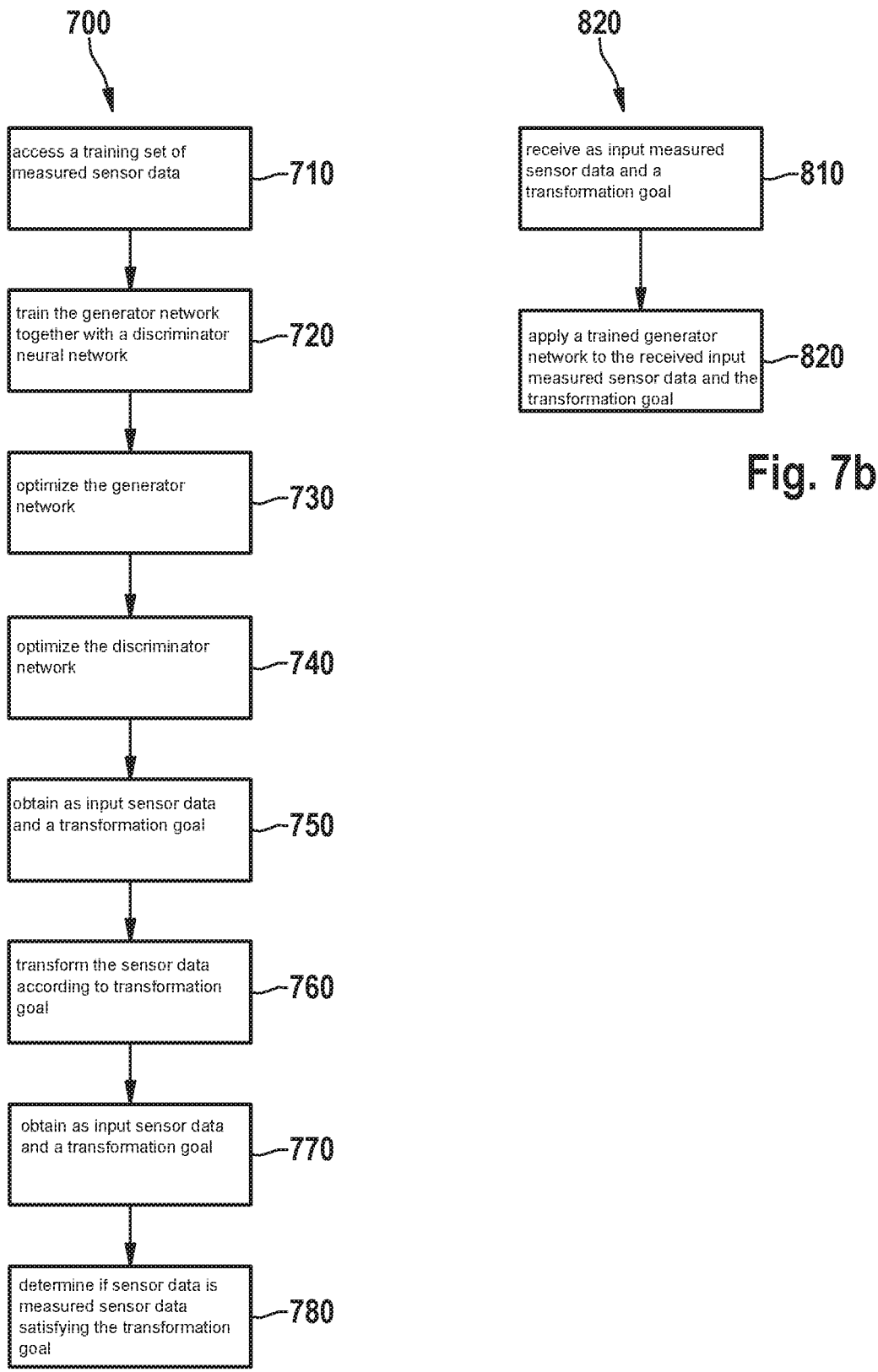

TRAINING SYSTEM FOR TRAINING A GENERATOR NEURAL NETWORK

CROSS REFERENCE

The present application claims the benefit under 35 U.S.C. § 119 of European Patent Application No. EP 19174400.2 filed on May 14, 2019, which is expressly incorporated herein by reference in its entirety.

FIELD

The present invention relates to a training system for training a generator neural network, a training system for training multiple separate generator neural networks, a generator system for a generator neural network, a training method for training a generator neural network, a training method for training multiple separate generator neural networks, a generator method for a generator neural network, a computer readable medium comprising data representing instructions to cause a processor system to perform a method, and a computer readable medium comprising data representing a neural network.

BACKGROUND INFORMATION

Image-to-image translation is a class of vision and graphics problems where the goal is to learn the mapping between an input image and an output image. The training may be done using a training set of aligned image pairs, known as paired training data, or without aligned image pairs, known as unpaired training data. In a paper "Unpaired Image-to-Image Translation using Cycle-Consistent Adversarial Networks" by Jun-Yan Zhu et al., a conventional image-to-image translation system is described (referred to as 'CycleGAN'). CycleGAN learns to translate an image from a domain X to a domain Y, and does not require paired training data. Given any two unordered image collections X and Y, in domain X and Y respectively, the conventional algorithm learns to translate an image from one into the other and vice versa.

The conventional system is a Generative Adversarial Network (GAN) containing two mapping functions: $G: X \rightarrow Y$ and $F: Y \rightarrow X$ and two associated adversarial discriminators $D_Y$ and $D_X$. $D_Y$ encourages G to translate X into outputs indistinguishable from domain Y, and vice versa for $D_X$ and F. To further regularize the mappings, two cycle consistency losses are introduced. If an image is translated from one domain to the other and back again one should arrive back at the original image. For forward cycle-consistency loss it is required that: $x \rightarrow G(x) \rightarrow F(G(x)) \approx x$, and for backward cycle-consistency loss: $y \rightarrow F(y) \rightarrow G(F(y)) \approx y$ The models discussed above generate reasonable image-to-image translation results. However, there are several issues with existing approaches.

One shortcoming of conventional image-to-image translation systems, both systems that employ paired training images and those that do not, such as CycleGAN, is that they only learn the transformation between two domains given in the training data and are not able to do any transformation out of scope of the two domains. Hence, for multi-domain translation-transforming a given image to several target domains, e.g., summer scene to autumn, winter or spring scenes, would require training of multiple generators and discriminators, each for a specific domain translation. Employing multiple generators and discriminators for training is not only cumbersome and computationally expensive, but may also lead to training instabilities. It is hard to balance multiple generators and discriminators and there is no guarantee that all the translation directions would be learned equally well.

Moreover, in the CycleGAN setting with two generators it is often observed that one of the translation dominates and the other serves as 'the helper'. This restricts the applicability of those models in practice, as their generalization and scalability properties are low.

Although for some domains CycleGAN does a good job transforming images, the results are far from uniformly positive. It remains challenging to perform high quality translations while preserving meaningful semantics of the scenes. On more complex scenarios that require more varied and extreme transformations, especially geometric changes, or on scenes with "new" unseen objects, the methods are more likely to fail. For example, when translating images from winter to summer, one probably aims to change snow to grass and to adjust lighting of the background. However, if the scene also contains foreground objects, e.g., people or animals, the existing methods do not differentiate between them and the background. The colors and appearances of the foreground often significantly change during translation as well, and may for example give a wolf in a snowy landscape a grassy pelt when the image is transformed to a summer domain. The same problem is observed if the translation objective is just to change the foreground object. For example, when translating from a horse image to a zebra image, one might wish to draw black-white stripes on top of the horses while keeping everything else unchanged. However, in this example colors of the background may also be affected during the translation.

This behavior can be attributed, at least in part, to the fact that the existing methods aim to learn meaningful translations while looking at only two discrete points in space and time—two images (paired or unpaired)—during training. This is a very challenging task for the network, particularly while training with unpaired data. As a result the generator converges to solutions that involve easy color and texture changes, while not caring about high-level semantics and plausibility of the synthesized scene.

Using synthesized images for data augmentation or for training of a further models these drawbacks can result in negative transfer which in turn may lead to a reduced, instead of improved, performance of the further model.

SUMMARY

In accordance with example embodiments of the present invention, to address these and other issues, an example training system is provided, configured for training a generator neural network arranged to transform measured sensor data into generated sensor data.

The example training system comprises a processor system arranged to train a generator network together with a discriminator neural network. The generator network is arranged to receive as input sensor data and a transformation goal selected from a plurality of transformation goals and is arranged to transform the sensor data according to the transformation goal. In an example embodiment, also the discriminator network is arranged to receive as input sensor data and a transformation goal selected from the plurality of transformation goals and to determine if the sensor data is measured sensor data satisfying the transformation goal. The latter is preferred, but it is also possible to combine a single generator network with multiple discriminator networks, or vice versa.

The example generator network and example discriminator network receive sensor data which is to be transformed or discriminated, but also a transformation goal. In other words, the same generator network is trained so that it can perform multiple transformations, according to the plurality of transformation goals. The same discriminator network is trained so that it can discriminate between generated and real images and/or between the different transformation goals.

Thus, it is avoided to train a different network for each transformation. The example generator network according to the present invention is exposed to input and output image pairs according to multiple transformation goals. This improves the training of the network. Moreover, the size of the single network according to the present invention may be significantly smaller than the size of the two networks G and F together according to the conventional system. In fact, an example embodiment of the generator network may be of a similar size as a cyclegan generator network. Using a transformation goal allows increasing the number of transformations goals, without having a quadratic increase in the number of parameters. Moreover, training instability and imbalances are avoided by having fewer cooperating networks.

Thus, a simpler yet more effective framework is provided which is able to perform multi-domain translation with a single generator and a discriminator, reducing the computational costs and improving the applicability of sensor data translation in practice. During inference one generator can perform translations to multiple domains and in different directions.

Improved training and/or an increased number of transformation goals allows the generator net to be applied in different settings. For example, the generator network may be trained to generate synthesized images for data augmentation or for training of a further model.

There are at least two ways in which the transformation goal may be used. In an example embodiment, a transformation goal may be a domain. The generator network may be trained to translate between different domains and the discriminator network may be trained to discriminate among the different domains. The number of domains may be two or more than two. For example, the training data may be labeled with a domain of the plurality of domains. For example, the labels may indicate the domain. A domain may also be referred to as classes.

Labels of sensor data may be categorical data, e.g., enumerated types, e.g., domains, e.g., summer, winter, etc. Labels of sensor data may be quantitative data, e.g., continuous types, e.g., temperature, timestamp, etc. Categorical labels may be used to define transformation goals that transform to a particular label. Quantitative labels may be used to define transformation goals that increase or decrease the label with a particular amount.

The transformation goal may also indicate a different type of transformation which may not directly be related to a domain label that may be associated to an image. For example, training images may be labeled with a time-stamp and the transformation goal may be to transform an image to an image with a later or earlier timestamp. An especially advantageous application that may use this is to use training images from a video, e.g., time-lapse images, labeled with a corresponding timestamp. Using video is a particularly advantageous way to obtain a large amount of training data. Using the transformation goal the generator network can be trained to age or younger an image by a specific amount of time. The conventional generator network is limited to translating images between two seasons, but an embodiment can age an image with a particular number of days or hours, etc. The training goals may be limited in various ways, for example, to changing the time of day, or to changing the time of the year, or both.

For image-to-image translation tasks video data is helpful for the system to learn not only to re-color the image but also to smoothly adjust the semantics of the scene while preserving high-level information and the plausibility of the scene. Using video data is particularly beneficial, as it is naturally paired. There is no need of human supervision for annotating images with labels. The spatial semantics of the visual content evolve slowly in time, which can be used as additional source of supervision.

Moreover, temporal distance between frames provides an extra source of information, two points close in time should be similar looking, which can be used for conditioning the direction of translation. In this case, the example framework according to the present invention can be also used for hallucinating possible past or future scenes conditioned on the current state at time.

Example embodiments of the present invention may be used on paired and on unpaired training data. Video is one way to obtain large amounts of paired training data. Videos are attractive because they are economical to obtain at massive scales yet still contain rich signals. Videos come with the temporal ordering of frames and strongly correlated nearby frames, which is a valuable asset for supervision.

The plurality of transformation goals can translate sensor data in at least two ways, although in an embodiment this may be more than 2, e.g., more than 3, 4, 8, etc., or even much more than 2, e.g., more than 1000, more than a million, etc. Goals may be general, e.g., transforming between seasons, but can also be quite specific, e.g., adding or removing specific objects at specific locations, e.g. adding or removing cyclists at a particular location in an image, e.g., occluding or des-occluding objects, etc. It is preferred that for each transformation goal in the plurality of transformation goals there is an opposite transformation goal so that performing the two corresponding transformation in sequence ought to be the identity, for which an appropriate cycle loss can be defined.

Such a multiple of transformation goals which in sequence obtain the identity may be longer than two. For example, for three domains, X, Y and Z one may perform cycles such of length two, e.g., X→Y→X or Z→X→Z, but also of length three X→Y→Z→X.

When time differences are used as transformation goals, opposite goals may be to age or younger sensor data by the same amount of time.

An aspect of the present invention concerns a generator system for a generator neural network arranged to transform measured sensor data into generated sensor data. An aspect of the present invention concerns a training method for training a generator neural network. An aspect of the present invention concerns a generator method for a generator neural network. An aspect of the present invention concerns a transitory or non-transitory computer readable medium comprising data representing instructions to cause a processor system to perform an embodiment of a method and/or comprising data representing a generator neural network and/or a discriminator neural network according to an example embodiment.

The generator network and discriminator network may also be referred to together as a generative neural network.

The training system and generator system are electronic devices, e.g., a computer. Trained or untrained neural networks may be represented as a plurality of parameters. One or more parameter may indicate how a neuron of the neural network transforms input data into output data.

Sensor data may include any data received from sensor. Sensor data may comprise input that is received from a sensor, e.g., over a network, over an API, over a connection, e.g., a digital connection, etc. The sensor may be an image sensor, a radar, etc.

Sensor data may, in particular, comprise data that extends in two or more dimensions. For example, sensor data may comprise planar data such as image data, or may be three dimensional, e.g., include a depth component. For example, sensor data may have a time dimension, for example, sensor data may be sensor readings over a time period. For example, sensor data may comprise video data. Sensor data may comprise, e.g., video, radar data, LiDAR data, ultrasonic sensor data, motion sensor data, etc.

The example generator neural network and/or discriminator neural network may comprise a feed-forward network, e.g., a frame- or video-based network. The generator neural network and/or discriminator neural network may comprise a CNN network and/or an RNN network or architecture.

The trained generator network may be used to translate sensor data. In an embodiment, often image data is used as a motivating example. However, the network may be adapted to other modalities. For example, instead of visual images, one may take radar data or the like.

In accordance with the present invention, an example embodiment of a multi-domain translation task with single generator and discriminator can be performed between any sensor signals; time series recordings of any sensor can be used as supervision. Embodiments can be used for data augmentation as well as domain transfer tasks. This is particularly valuable for training machine learning systems for autonomous driving. It enables realistic variations of real images, e.g., by changing weather and lighting conditions, or transferring a scene into a new environment, e.g., from urban to rural, as well as transferring from synthetic to real data.

A particular advantageous application of the generator network is to augment training data or testing data for another network, for example, a sensor data classifier, e.g., an image classifier. A sensor data classifier may be used in a further device, e.g., an autonomously moving machine, e.g., an autonomous vehicle, or a robot arm or the like. In autonomously moving machines a sensor data classifier may be used to classify objects in the vicinity of the machine. Based on the classified objects, a controller may be configured to generate a control signal for controlling the machine, e.g., a physical system. The further device may be a computer-controlled machine, for example, a robot, a vehicle, a domestic appliance, a power tool, a manufacturing machine. A sensor data classifier may also be used in a system for conveying information, like a surveillance system or a medical (imaging) system, an image labelling system, etc. The sensor data classifier may be used in a personal assistant or an access control system, e.g., to grant access to a system, e.g., by face recognition.

Neural networks, e.g., sensor data classifiers, in these further devices, typically, operate well in large number of cases, however it is important to test such classifiers for corner cases. For example, an autonomous vehicle may be tested on sensor data recorded in winter. Using an embodiment of the generator, the sensor data may be converted to summer, and used to test the autonomous vehicle for summer data. For example, the machine may be used with sensor data recorded during day time. Using a generator, the sensor data may be aged so that the sensor data reflects nighttime. For example, sensor data for which it is known that the machine performs poorly may be converted to multiple different circumstance and thus may be extended, e.g., converted to different weather, seasons, time of day, time of year, number of other objects, visibility, etc. For example, it may be hard to find sensor data for which a neural network, e.g., a classifier such as used in an autonomous machine or in a medical system performs bad. Typically, these are rare corner cases. In an embodiment, a sensor data classifier, e.g., an image classifier, is trained by providing a sensor data, e.g., sensor data on which the image classifier performs poorly, or in which image classifiers typically perform poorly, translate the provided sensor data by applying a generator network as in an embodiment using a transformation goal, preferably using multiple transformation goals, thus obtaining new sensor data, preferably multiple new sensor data, and using the new sensor data(s) for training the sensor data classifier.

In accordance with the present invention, an example embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In accordance with the present invention, in an example embodiment, the computer program comprises computer program code adapted to perform all or part of the steps of an embodiment of the method when the computer program is run on a computer. Preferably, the computer program is embodied on a computer readable medium.

Another aspect of the present invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the present invention will be described, by way of example only, with reference to the figures. Elements in the figures are illustrated for simplicity and clarity and have not necessarily been drawn to scale. In the Figures, elements which correspond to elements already described may have the same reference numerals.

FIG. 1 schematically shows an example of an embodiment of a generator network.

FIG. 2a schematically shows an example of an embodiment of a training system.

FIG. 2b schematically shows an example of an embodiment of a generator system.

FIG. 7a schematically shows an example of an embodiment of a training method.

FIG. 7b schematically shows an example of an embodiment of a generator method.

Figure 2C:
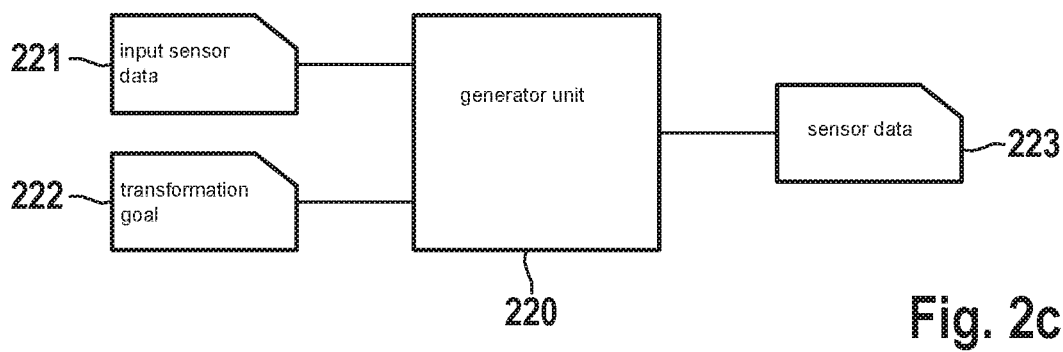
FIG. 2c schematically shows an example of an embodiment of a generator network.

LIST OF REFERENCE NUMERALS 100 a generator neural network
151 sensor data
152, 153, 154 a transformation goal
120 an encoder part
130 a processing part
140 a decoder part
141 generated sensor data
200 a training system
210 an optimizer
220 a generator unit
230 a discriminator unit
240 a training set storage
242 a transformation goals storage
250 a generator system
252 an input unit
254 an output unit
221 sensor data
222 a transformation goal
223 generated sensor data
231 sensor data
232 a transformation goal
233 a discriminator output
234, 235 sensor data
236 a transformation goal
237 a discriminator output
238,239 a discriminator unit
301-303 measured sensor data
311-313 a domain
321-323 a further domain
331-333 measured sensor data
340 a time direction
341-343 a timestamp
351-353 a training set
361 a time difference
441-443 sensor data channel
451 transformation goal channel
461-464 convolutional filter
470 a pooling layer
480 a fully connected layer
410 sensor data inputs
411-412 sensor data item
420 transformation goal inputs
421 transformation goal item
430 a neuron
431 a neuron output
510, 520 a domain of sensor data
511, 521 a sensor data
523, 511' a generated sensor data
512, 522 a transformation goal
530, 540 a domain of sensor data
531, 541 a sensor data
610 measured sensor data
620 generated sensor data
611 a car
612 an occluded person
613 a desoccluded person
630 a transformation goal
631 a desocclusion part
640 measured sensor data
650 a transformation goal
651 a desocclusion part
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF EXAMPLE EMBODIMENTS

While the present invention is susceptible of embodiments in many different forms, there are shown in the figures and will herein be described in detail one or more specific example embodiments, with the understanding that the present disclosure is to be considered as exemplary of the present invention and not intended to limit the present invention to the specific embodiments shown and described.

In the following, for the sake of understanding, elements of embodiments are described in operation. However, it will be apparent that the respective elements are arranged to perform the functions being described as performed by them.

Further, the present invention is not limited to the embodiments, and the present invention lies in each and every novel feature or combination of features described herein or described mutually separately.

In an example embodiment, the training system comprises two networks: the generator G and the discriminator D, that play a competing game. The task of G is to transfer the given sample x into the desired domain $z_Y$ in such way that it follows the same distribution as the real data in the domain $z_Y$. The task of D is to distinguish the real sample y in domain $z_Y$ from any other sample in other domains or generated samples.

Both D and G can be modeled as deep neural networks, where G takes as input the source image x and the target domain information encoded in $z_Y$ and D takes as input the target image and its corresponding domain. The encoded domain information can be provided to the G and D networks as input along with the image or/and to intermediate layer features via augmenting them with extra channel(s) which contain the domain information. When building the training, the new data samples may be constructed based on the image and the domain information, in particular now $(x_{data}, z_X)$ and $(y_{data}, z_Y)$ represent the True class and pairs $(x_{gen}, z_X)$, $(y_{gen}, z_Y)$ along with $(x_{data}, z_Y)$, $(y_{data}, z_X)$, $(x_{gen}, z_Y)$, $(y_{gen}, z_X)$ represent the Fake class. The latter pairs—$(x_{data}, z_Y)$, $(y_{data}, z_X)$, $(X_{gen}, z_Y)$, $(y_{gen}, z_X)$—help the discriminator to distinguish if the target image is in the right domain. These pairs may be used in the domain loss. The objective function could then be:

$$G^* = \arg\min_G \max_D L(G,D) = \arg\min_G \max_D [L_{GAN}(G, D, z_{X/Y}) + \lambda_{domain} L_{domain}(G, D, z_{X/Y}) + \lambda_{CYC} L_{CYC}(G, z_{X/Y}) + L_{identity}(G, z_{X/Y})]$$

Example embodiments may exploit domain loss and the variant of the cycle consistency loss in its loss function. Example embodiments may use the identity loss for the generator, so G would be able to do the identity mapping, learning to preserve better valid characteristics between the input and output.

The described above setting does not require the paired data for training. In case the paired data is available the reconstruction loss can be used in order for G to learn the direct mapping between the two domains. One of the examples where the paired data is available for free are the time series, e.g., video data, which one can use to train a better performing G.

Example embodiments may be trained in the standard GAN fashion using regularization techniques available in the literature. During the inference, in contrast to previous work, one generator can perform transfer between multiple domains given the source sample and the target domain.

Interestingly, the generator domain may be trained to apply two transformations at the same time. For example, sensor data may be transformed to the intersection of two domains. Encoding the transformations in such a case can be done by using a mapping function, e.g., a mapping that maps the combination of transformation goals to a unique value. Alternatively, this may be done by using multiple transformation channels. The latter option is more preferred.

Preferred embodiments use a single generator network and a single discriminator network, each having a transformation goal as an additional input. For categorical labels, this is not necessary though. For example, one could use a single generator network having a transformation goal as an additional input trained together with a discriminator network for each transformation goal. For example, with two domains, such a system would have three networks. In this setting even the discriminator networks benefit since the generator network becomes more sophisticated. Likewise, one could use a multiple generator networks, one for each transformation goals, and a single discriminator network having the transformation goals as an additional input.

The example embodiments described herein will assume, both for categorical as for quantized labels, that a single generator network is used and a single discriminator network. It is however noted that such embodiment for categorical labels could be changed towards a single generator with multiple discriminators, or a single discriminator and multiple generators, by replacing the discriminator or generator, respectively, e.g., to the discriminator or generator of cyclegan.

Compared to cyclegan, the generator part improves by replacing two network with a single network having a transformation goal as an additional input; also the discriminator part improves by replacing two network with a single network having a transformation goal as an additional input. Moreover, if both generator and discriminator part are replaced by a single network each, either part improves because of replacing two networks by one and the benefits that brings, but also because the other part improves.

In preferred embodiments, the generator network and the discriminator network are both arranged to receive a transformation goal as input: the generator network being arranged to perform the transformation according transformation goal, and the discriminator networks being arranged to verify if a sensor data matches a transformation goal and if the transformation goal is real. However, benefits are still obtained if either one of the generator network and the discriminator network are so arranged. The loss functions may be used as disclosed herein appropriately adapted for the situation.

In particular, one may use multiple discriminator networks with a single generator network, in this case the multiple discriminator networks are specialized, e.g., each one is associated with a particular one of the transformation goals, whereas the single generator network receive the transformation goal as input.

In a particularly interesting variant, one may use multiple generator networks with a single discriminator network, in this case the multiple generator networks are specialized, e.g., each one may be associated with a particular one of the transformation goals, whereas the single discriminator network receives the transformation goal as input. An advantage of this variant is that the generator networks are improved, due to the improved discriminator, but nevertheless networks are obtained that do not require an additional input. In an embodiment, a loss function loss is introduced for discriminator system, which forces the discriminator to learn domain information. For example, this system may include the term $E_{Pdata}[\log(1-D(x,z_Y))]+E_{Pdata}[\log(1-D(y, z_X))]$ in the loss function.

For example, in an example embodiment, a training system for training multiple separate generator neural networks each arranged to transform measured sensor data into generated sensor data, the system comprising a communication interface for accessing a training set of measured sensor data, a processor system arranged to train the multiple generator networks together with a discriminator neural network, wherein the generator networks are optimized to transform measured sensor data into generated sensor data, and the discriminator network is optimized to distinguish between measured sensor data and generated sensor data, wherein each one of the multiple generator networks is associated with a respective transformation goal, and arranged to receive as input sensor data and to transform the sensor data according to the transformation goal, and wherein the discriminator network is arranged to receive as input sensor data and a transformation goal selected from the plurality of transformation goals and to determine if the sensor data is measured sensor data satisfying the transformation goal.

Embodiments with multiple generator networks or with multiple discriminator network may be adapted according to the features set out for embodiments with a single generator networks and a single discriminator network.

FIG. 2a schematically shows an example of an example embodiment of a training system 200. Training system 200 is configured for training a generator neural network arranged to transform measured sensor data into generated sensor data. For example, system 200 may comprise a generator unit 220 configured for applying the generator neural network, and a discriminator unit 230 configured for applying a discriminator neural network. For example, generator unit 220 and/or discriminator unit 230 may comprise storage for storing parameters of the respective neural networks. For example, generator unit 220 and/or discriminator unit 230 may be configured to receive network inputs, apply the inputs and the parameters according to the neural network type and to provide the network result on an output.

System 200 comprises an optimizer 210. Optimizer 210 is configured to train the generator network together with the discriminator neural network. The generator network is optimized to transform measured sensor data into generated sensor data, and the discriminator network is optimized to distinguish between measured sensor data and generated sensor data. In order to train the two neural networks, optimizer 210 has access to a training set, e.g., as stored in a training set storage 240. The training set comprises measured sensor data. Sensor data may be image data, e.g., images, but may comprise instead or in addition a wide variety of data, e.g., radar data, ultrasonic sensor data, etc. In an example embodiment, sensor data may be obtained from a sensor configured to produce two-dimensional data characterizing an environment of the sensor. The sensor may be employed in a machine. In an example embodiment, at least part or all of the sensor measurements have domain information and/or sensor time information indicating the domain in which the condition, e.g., the environment or environment type, and/or the time when the sensor data was obtained.

A sensor data may be a multiple of conjoint sensor data, possibly of different sensor modalities. For example, in the example of autonomous vehicles one sensor data item may comprise, one or more of image, radar, and other sensor data, typically concurrent data recorded from multiple sensors. For example, system 200 may comprise a communication interface for accessing the training set. Sensor data may be measured, e.g., as received from a sensor, e.g., real, or true; or sensor data may be generated, e.g., as generated by a generator unit, e.g., fake.

Once the generator network is sufficiently trained, e.g., after convergence or after exhausting the training data, or after a preset number of training iterations, the generator network may be used in an application, typically without the corresponding discriminator network. For example, FIG. 2b schematically shows an example of an embodiment of a generator system 250. Generator system 250 is configured to apply a generator neural network, such as the generator neural network trained by system 200, e.g., the generator neural network of generator unit 220. Generator system 250 is thus arranged to transform measured sensor data into generated sensor data. System 250 may comprise an input unit 252 configured for receiving as input measured sensor data. Input unit 252 might also be used to receive sensor data that was not measured but generated. After transforming the received input sensor data, the generated output sensor data may be put on output 254, e.g., transmitted. For example, system 250 may comprise a communication interface for receiving and/or transmitting the sensor data.

System 250 comprises a generator system 250 configured to apply the trained generator network to the received input measured sensor data. Typically, system 250 is configured to perform further tasks. For example, system 250 may be configured to augment further training data for a further neural network, e.g., for a classifier. System 250 and system 200 may be the same system, or they may not be. Systems 200 and/or 250 may be a single device or may comprise multiple devices.

Systems 200 and/or 250 may communicate with each other or with external storage or input devices or output devices over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna, etc.

The execution of system 200 and 250 is implemented in a processor system, e.g., one or more processor circuits, examples of which are shown herein. FIGS. 2a and 2b show functional units that may be functional units of the processor system. For example, FIGS. 2a and 2b may be used as a blueprint of a possible functional organization of the processor system. The processor circuit(s) are not shown separate from the units in these figures For example, the functional units shown in FIGS. 2a and 2b may be wholly or partially implemented in computer instructions that are stored at system 200 and 250, e.g., in an electronic memory of system 200 and 250, and are executable by a microprocessor of system 200 and 250. In hybrid embodiments, functional units are implemented partially in hardware, e.g., as coprocessors, e.g., neural network coprocessors, and partially in software stored and executed on system 200 and 250. Parameters of the network and/or training data may be stored locally at system 200 and 250 or may be stored in cloud storage.

Returning to FIG. 2a, interestingly, the generator network and discriminator network are arranged to receive as input a sensor data and a transformation goal. For the generator network the transformation goal indicates the transformation that the generator network needs to perform on the input sensor data. For the discriminator network the transformation goal indicates what the type of the input sensor data ought to be, e.g., for the discriminator network the transformation goal indicates that the input sensor data is of the same type as the type that the generator network attempts to create when given that transformation goal.

The transformation goals may be selected from a plurality of transformation goals. The transformation goals may be discrete domains, e.g., a limited number, or they may be continuous, e.g., a high number. For example, system 200 may comprise a transformation goals storage 242. For example, the generator network may be configured to receive input sensor data and a transformation goal, and configured to transform the input sensor data according to the transformation goal. The discriminator network may be arranged to receive as input sensor data and a transformation goal and may be arranged to determine if the sensor data is measured sensor data satisfying the transformation goal. Preferably, for each goal there is an opposite goal, but even if not, most preferably, the goals allow the definition of cycles, preferably a cycle may be defined for each operator. Cycles of length two are preferably used, but longer cycles may be used as well.

Likewise, also system 250 may use transformation goals. For example, input unit 252 may be configured for receiving as input measured sensor data and the transformation goal. Generator unit 220 in system 250 may be configured to apply the trained generator network to the received input measured sensor data and the transformation goal. The generator network in system 250 is arranged to receive as input sensor data and a transformation goal and is arranged to transform the sensor data according to the transformation goal.

Instead of using transformation goals, a system could instead use multiple generator networks and/or multiple discriminator networks but using transformation goals is simpler yet still effective in performing sensor data transformations, e.g., image-to-image translation. Using a single generator reduces the computational costs and improves the applicability. In particular the size of the trained network may be reduced. A single discriminator improves the discriminator and thus the generator.

The discriminator network in discriminator unit 230 may have a single bit as output, e.g., yes/not, e.g., real/fake. Multiple outputs are also possible, e.g., a separate bit output to indicate if the image or images are real and a separate bit output to indicate if the image complies with the transformation goal; e.g., a separate bit output to indicate if the image or images are real and a separate bit output to indicate if the image or images are real and complies with the transformation goal.

The discriminator network may be trained to output fake if the sensor input was generated, in particular was generated by the generator network. The discriminator network may be trained to output fake if the sensor input was not generated but measured (real) but does not conform to the transformation goal. The discriminator network may be trained to output yes or real if the sensor input was measured (real) and conforms to the transformation goal. The discriminator network is thus trained to determine that sensor data and transformation goal are according to the training set.

Typically, the discriminator is trained for all three objectives together, so that the discriminator is trained to output yes for training pairs, e.g., pairs of a measured sensor data and corresponding transformation goal, but fake for anything else, e.g., pairs of generated data and any transformation goal, and for pairs of measured data but the wrong transformation goal.

Transformation goals can be used to supply a wide variety of information to the networks. In a first example, a transformation goal may comprise, or be, a domain. For example, for the generator network a domain may indicate that the transformation is towards the indicated domain. For example, for the discriminator network the domain may indicate that the input sensor data should be real and from the indicated domain.

Figure 3A:
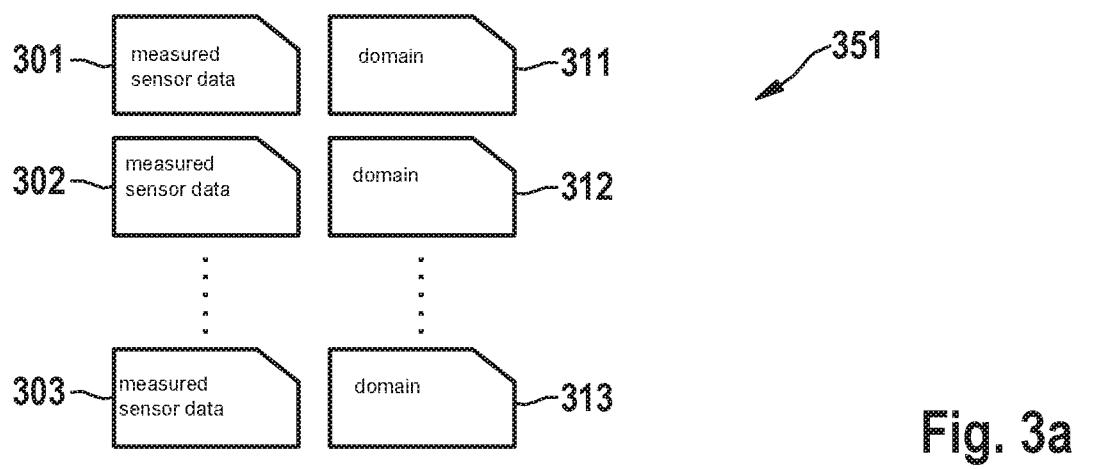
FIG. 3a schematically shows an example of an embodiment of a training set.

For example, the plurality of transformation goals may comprise a plurality of domains, the training data may be labeled with a domain of the plurality of domains, the generator network being configured to transform sensor data to a domain according to the transformation goal, the discriminator network being configured to determine if the input sensor data satisfies the domain according to the transformation goal. FIG. 3a schematically shows an example of an embodiment of a training set 351. Shown in FIG. 3a is training set 351. Training set 351 comprises multiple measured sensor data, shown are sensor data 301-303 and multiple corresponding domains, shown are domains 311-313. For example, sensor data may be images, and the domains may be summer of winter. For example, sensor data may be images, and the domains may be summer, winter, autumn or spring, etc.

Figure 3B:
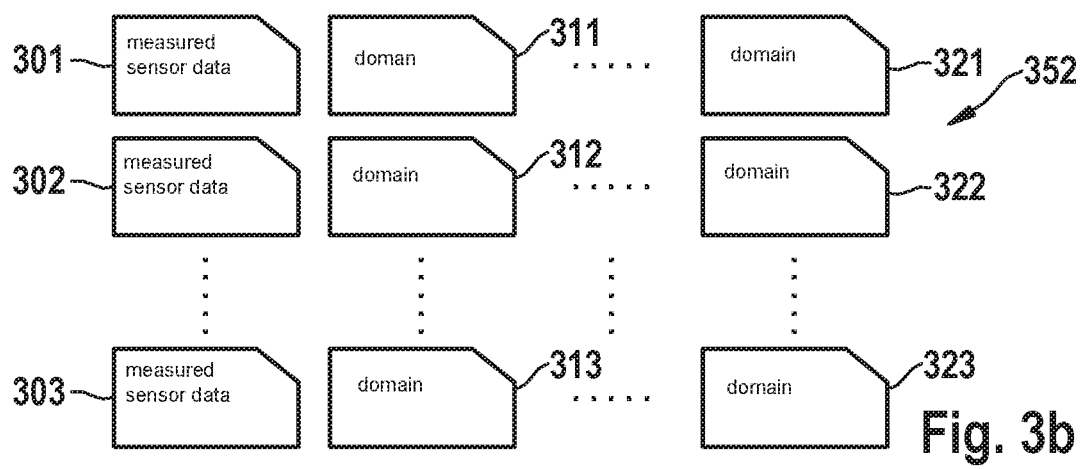
FIG. 3b schematically shows an example of an embodiment of a training set.

A sensor data may be associated with multiple domains. FIG. 3b schematically shows an example of an embodiment of a training set 352. Training set 351 comprises multiple measured sensor data, shown are sensor data 301-303. Each sensor data may be associated with multiple corresponding domains. Shown are domains 311-313 and domains 321-323. For example, sensor data may be images, and the domains may indicate a season (summer/winter or summer/winter/autumn/spring, etc.) and a landscape type (e.g. urban/rural). Using training set 352, the generator network and/or discriminator network may be configured to receive a single domain, e.g., domain summer to convert a rural or urban winter image to summer, or multiple domains, e.g., summer and urban, etc. The same holds for the discriminator network. Domains may also be referred to as labels. For example, an image may be labelled with the label summer to associate it with the domain summer.

The training data may be extended with unlabeled data. One can also use unlabeled data to train the system either as in cycle consistency or as an additional training data for the discriminator. In the latter case, the output of the discriminator may be changed to output 2 decisions: real or fake sensor data, in domain or not in domain sensor data.

For example, for additional consistency training an unlabeled image may be used for cycle consistency. For example, the unlabeled image may be mapped to a domain and then cycled, e.g., unlabeled->X->Y->X'. Here the generator network is applied three times, and difference between X and X' should be small.

For example, you may use the label 'real_image' which is satisfied by any image. The discriminator can then learn to distinguish between a real image with the label 'real_image' and a generated image. Multiple outputs for the discriminator are especially beneficial in this embodiment.

In an example embodiment, the generator network and discriminator network are trained using solely unpaired data. In this case minimizing cycle losses may be used to ensure correct convergence of the networks. In another embodiment, the generator network and discriminator network may be trained on paired data. In this case, pairs of sensor data are known which represent the same circumstances but differ only in the domain. For example, the same landscape but in a different season. The generator network and discriminator network may be trained solely on paired data, e.g., as obtained from video, or time-lapsed images. For example, the training set may comprise one or more sets of a first measured sensor data, a transformation goal and second measured sensor data, the generator network being trained to transform the first measured sensor data into the second measured sensor data according to the transformation goal. Interestingly, the two networks may be trained on a mixture or paired and unpaired training data as well. For the first case, cycle losses may be used, for the second type a distance norm may be used to compute the loss.

Using video or time-lapse images for training data has the additional advantage that the spatial semantics of the visual content evolve slowly in time, which can be used as additional source of supervision. For example, an additional regularization term may be introduced in the generator loss for minimization, constraining that the generated images or the features of the generated images should be as similar to each other as closer they are in time. In an embodiment, this may use the following mathematical formulation:

$$Reg(G)=EP_{data}[\max(\|G(x,t1)-G(x,t2)\|/\|t1-t2\|,\alpha)],$$

wherein $\| \|$ can be any Lp norm, e.g., L1, or any other distance measure. The distance between generated samples can be also calculated in the feature space, for example:

$$Reg(G)=EP_{data}[1/L\Sigma_{l=1}^{L}(\max(\|G_l(x,t1)-G_l(x,t2)\|/\|t1-t2\|,\alpha))],$$

wherein $G_l$ denotes intermediate layer features. This allows to use additional free information from videos as supervision for training.

Note that the measured sensor data in the different domains need not be of the same sensor modality. For example, the sensor modalities may be, e.g., audio and video data. This may be used to generate appropriate audio given a video or to generate appropriate video given the audio. This can be used in training data augmentation as well. For example, the sensor modalities may be, e.g., radar and image data. This may be used to generate appropriate images given radar data or to generate appropriate radar data given the image data. The image and/or radar data may be obtained from a vehicle, and may be used to train an autonomous vehicle. The different sensor modalities may be measured together at the same time, to obtain paired training data. The different sensor modalities may be measured separately, to obtain unpaired training data. Paired and unpaired data maybe combined, or not.

Figure 5A:
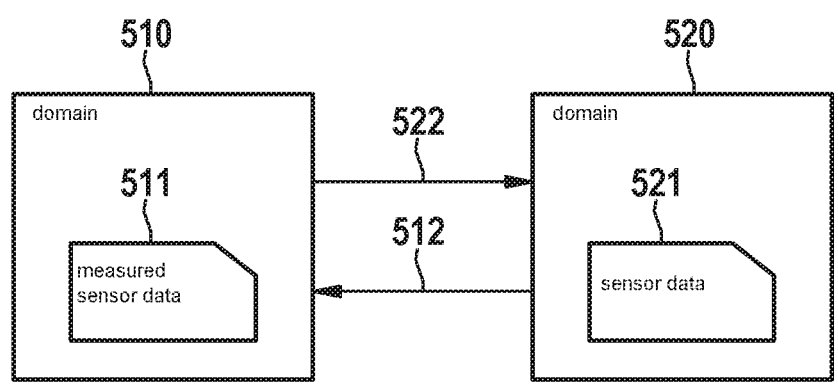
FIG. 5a schematically shows an example of an embodiment of sensor data.

FIG. 5a schematically shows an example of an embodiment of sensor data. Shown in FIG. 5a are two domains of sensor data 510 and 520, e.g., two domains. The two domains may be defined by the corresponding images in the training data. For example, the two domains may be summer and winter as defined by images in the training data labelled summer or winter respectively. For example, two sensor data 511 and 521 are shown in domains 510 and 520 respectively.

Figure 5B:
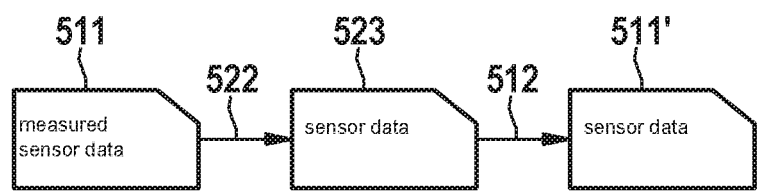
FIG. 5b schematically shows an example of an embodiment of sensor data.

FIG. 5b schematically shows an example of an embodiment of sensor data. Shown in FIG. 5a is a measured sensor data 511. The measured sensor data 511 is transformed to a generated sensor data 523 using a transformation goal 522. For example, transformation goals are domains, and the transformation goal 522 is summer, than sensor data 523 should be transformed to a summer setting. For example, if sensor data 511 represents sensor data, e.g., vehicle radar data and/or image data, obtained in winter, then generated sensor data 523 may represent vehicle radar data and/or image data in summer. In this case, and opposite transformation, represented by transformation goal 512 is available. For example, transformation goal 512 may correspond to domain winter. Applying the summer transformation to winter data 511 obtained the generated summer data 523, if the winter transformation is applied a further generated sensor data 511' is obtained. Embodiments use the so-called cycle loss to optimize the neural network according to which sensor data 511' should be close to sensor data 511, e.g., according to a distance norm.

Below a more mathematical description is given how the generator network G and discriminator network D may be trained. Let X and Y be two domains, e.g., domains 510 and 520, the goal is to learn the mapping G between them X↔Y given unpaired or paired samples x∈X and y∈Y. The data distributions are denoted as $x \sim p_{data}(x)$ and $y \sim p_{data}(y)$. Let y' (and y'') denote the translated sample, the key requirement is that y' should appear drawn from domain Y, while preserving the characteristics of the sample x.

Domain information may be provided directly as input to the generator, i.e. y'=G(x,$z_Y$), where $z_Y$ encodes the target domain direction Y. This avoids the need of using a second generator to learn the backward translation, in other words we may have x'=G(y,$z_X$). Generator and discriminator may be trained given an appropriate loss function. A possible loss function that may be used, e.g., the objective, is the following:

$$L(G,D)=L_{GAN}(G,D,z_X)+L_{GAN}(G,D,z_Y)+\lambda_{domain}L_{domain}(G,D,x_X,z_Y)+\lambda_{CYC}L_{CYC}(G,z_X,z_Y), \text{ where}$$

$$L_{GAN}(G,D,z_Y)=E_{Pdata}[\log D(y,z_Y)]+E_{Pdata}[\log(1-D(G(x,z_Y),z_Y))],$$

$$L_{GAN}(G,D,z_X)=E_{Pdata}[\log D(x,z_X)]+E_{Pdata}[\log(1-D(G(y,z_X),z_X))]$$

Herein, is expectation denoted by E. In general, one may replace the log likelihood objective by another scaling function, e.g., least-squares loss. To ensure that the discriminator D learns to recognize that the sample is generated in the target domain an additional domain loss may be introduced, which penalizes the discriminator D if it does not see that the target domain of the image is incorrect, for example, one may use:

$$L_{domain}(G,D,z_X,z_Y)=E_{Pdata}[\log(1-D(x,z_Y))]+E_{Pdata}[\log(1-D(y,z_X))]+\lambda_{domain\_gen}(E_{Pdata}[\log(1-D(G(y,z_X),z_Y))]+E_{Pdata}[\log(1-D(G(x,z_Y),z_X))]).$$

The $L_{domain}(G,D,z_X,z_Y)$ loss is particularly advantageous, since with this loss the discriminator learns domain information. For example, it learns to penalize the generator if the generated sample is not in the right domain. Without this loss it is harder for the generator to produce samples in the right domain. The first part of $L_{domain}(G,D,z_X,z_Y)$ is more important, since it relates to the real samples for the discriminator, in an embodiment the parameter $\lambda_{domain\_gen}$ may be set to zero.

To learn the domain mappings embodiment may make use of cycle consistency. For example,
(a) Forward Cycle-Consistency Loss:

$$x \rightarrow G(x,z_Y)=y' \rightarrow G(G(x,z_Y),z_X)=G(y',z_X) \approx x'', \text{ and}$$

(b) Backward Cycle-Consistency Loss:

$$y \rightarrow G(y,z_X)=x' \rightarrow G(G(y,z_X),z_Y)=G(x',z_Y) \approx y'',$$

These requirements may be expressed as $$L_{CYC}(G,z_X,z_Y)=E_{Pdata(x)}[\|G(G(x,z_Y),z_X)-x\|_1]+E_{Pdata(y)}[\|G(G(y,z_X),z_Y)-y\|_1].$$

The aim may then be to solve: $G^*=\arg \min_G \max_D L(G,D)$. Identity and reconstruction losses may be added for training G:

Identity loss: $L_{identity}(G,z_X,z_Y)=E_{x \sim pdata(x)}[\|G(x,z_X)-x\|_1]+E_{y \sim pdata(y)}[\|G(y,z_Y)-y\|_1].$ The identity loss encourages the generator to be near an identity mapping when real samples of the target domain are provided as the input. This helps the mapping to preserve color composition between the input and output.
Reconstruction Loss:

$$L_{reconstr}(G,z_X,z_Y)=E_{x,y \sim pdata(x,y)}[\|G(y,z_X)-x\|_1]+E_{x,y \sim pdata(x,y)}[\|G(x,z_Y)-y\|_1],$$

in case some paired samples are available.

Figure 5C:
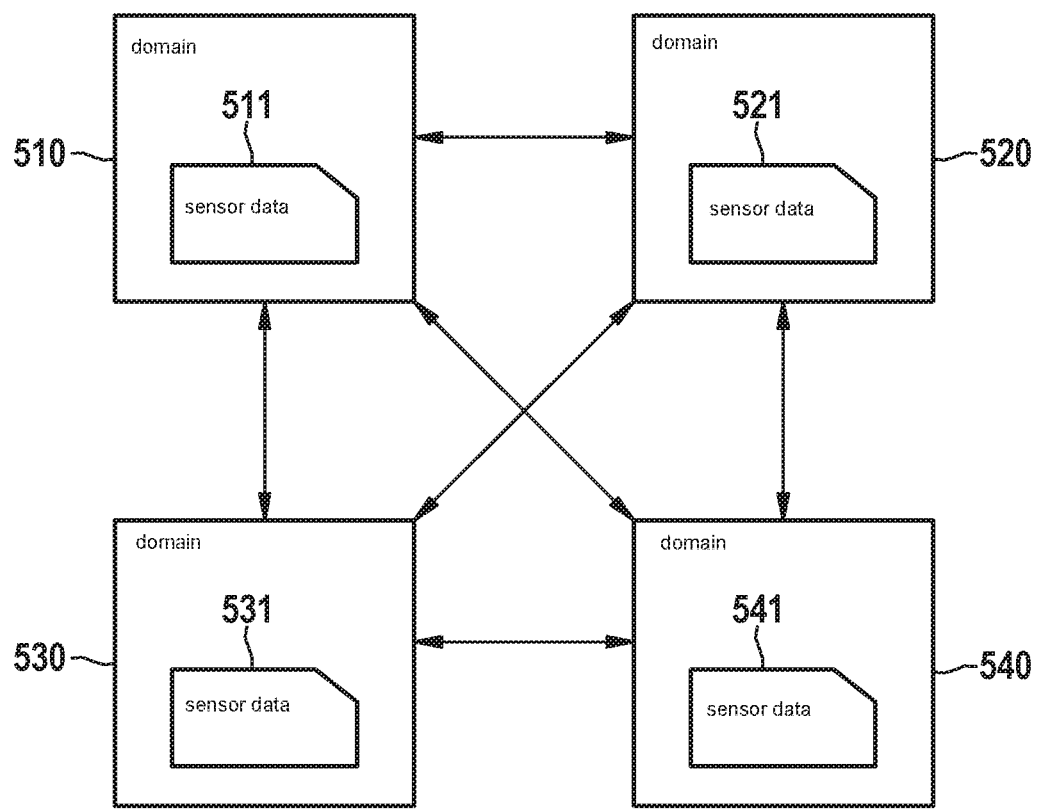
FIG. 5c schematically shows an example of an embodiment of sensor data.

FIG. 5c schematically shows an example of an embodiment of sensor data. Compared to FIG. 5a the number of domains has been increased beyond two; shown in FIG. 5c are four domains. In addition to the domains of FIG. 5a, FIG. 5c shows sensor data domain 530 and domain 540, e.g., domains 530 and 540. An example of sensor data in the domains, sensor data 531, 541, is also shown.

The generator network can transform sensor data to any one of the domains by providing the appropriate transformation goal. For example, one may transform to domain 520 from sensor data 511, 531 and 541. Having more than two domains increases the number of possible transformations. For two domains there may be transformation goals, i.e., there are a plurality of transformation goals. For more than two domains there may be more than two transformation goals in the two plurality of transformation goals.

In order to define a cycle loss the transformations preferably allow the definition of cycles. For example, this is the case if one can transform from any domain to any other.

It is an advantage that the system can be easily extended to multi-domain translation, with one generator performing translations to multiple domains and in different directions and one discriminator assessing if the sample is real or generated and in the correct target domain. For example, one may use the following $$L(G,D)=\Sigma_i(\Sigma_{j\neq i}(L_{GAN}(G,D,z_i)+\lambda_{domain}L_{domain}(G,D,z_i,z_j)+\lambda_{CYC}L_{CYC}(G,z_i,z_j)+\lambda_{identity}L_{identity}(G,z_i)+\lambda_{reconstr}L_{reconstr}(G,z_i))),$$

where
$x_i$ is the sample from the domain $z_i$, $i=1, \ldots, N$, N is the number of considered target domains;

$$L_{GAN}(G,D,z_i)=E_{Pdata}[\log D(x_i,z_i)]+E_{Pdata}[\log(1-D(G(x_{j,j\neq i},z_i)z_i))];$$

$$L_{domain}(G,z_i,z_j)=E_{Pdata}[\log(1-D(x_i,z_j))]+\lambda_{domain\_gen}E_{Pdata}[\log(1-D(G(x_i,z_j)z_i))];$$

$$L_{CYC}(G,z_i,z_j)=E_{Pdata}[\|G(G(x_i,z_j)z_i)-x_i\|_1];$$

$$L_{identity}(G,z_i)=E_{pdata}[\|G(x_i,z_i)-x_i\|_1];$$

$$L_{reconstr}(G,z_i)=E_{pdata}[\|G(x_{j,j\neq i},z_i)-x_i\|_1],$$

in case some paired samples are available.

The above loss function includes cycles of length two. This is preferred, but not strictly necessary; alternatives and/or extensions are possible. For example, one may define a cycle loss if the plurality of transformation goals comprises at least one multiple of transformation goals such that sequentially transforming measured sensor data according to the multiple of transformation goals defines an identity transformation. For example, in the situation of FIG. 5a, a cycle may go from domain 510 to domain 520 and back. For example, for FIG. 5c, a cycle may go from domain 510 to domain 520 to domain 540 and back to domain 510. The loss may include a loss term for this cycle, e.g., the returning to domain 510 via domains 520 and 540 should be close to the original image.

FIG. 2c schematically shows an example of an embodiment of a generator network 220, e.g., as it may be used in system 200 or 250. Generator network 220 is configured to receive as input sensor data 221 and a transformation goal 222 and to produce as output sensor data 223. Sensor data 223 is by definition generated sensor data. Input sensor data 221 may be measured sensor data, e.g., as available in a training set, or may be generated sensor data, e.g., to compute a cycle loss.

Figure 2D:
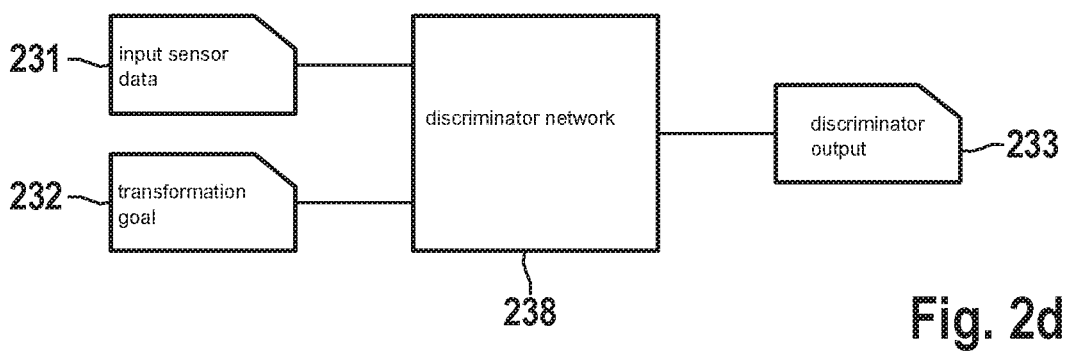
FIG. 2d schematically shows an example of an embodiment of a discriminator network.

FIG. 2d schematically shows an example of an embodiment of a discriminator network 238, e.g., as it may be used in system 200. Discriminator network 238 receives as input sensor data 231 and a transformation goal 232. Discriminator network 238 may be trained to discriminate if input sensor data 231 is real, e.g., measured, and if it corresponds to the transformation goal 232. For example, in case the transformation goal is a domain, discriminator network 238 may verify that sensor data 231 is a member of that domain. Discriminator output 233 may be a binary output.

Discriminators with a binary output work well, however the output of the discriminator may be varied. For example, in an embodiment, a discriminator network separately determine if the image, or one of the input images, is generated, and if the image is according to the domain. Other options are possible.

Discriminator network 238 is particularly suited for labeled training data, e.g., for translations between domains.

Figure 2E:
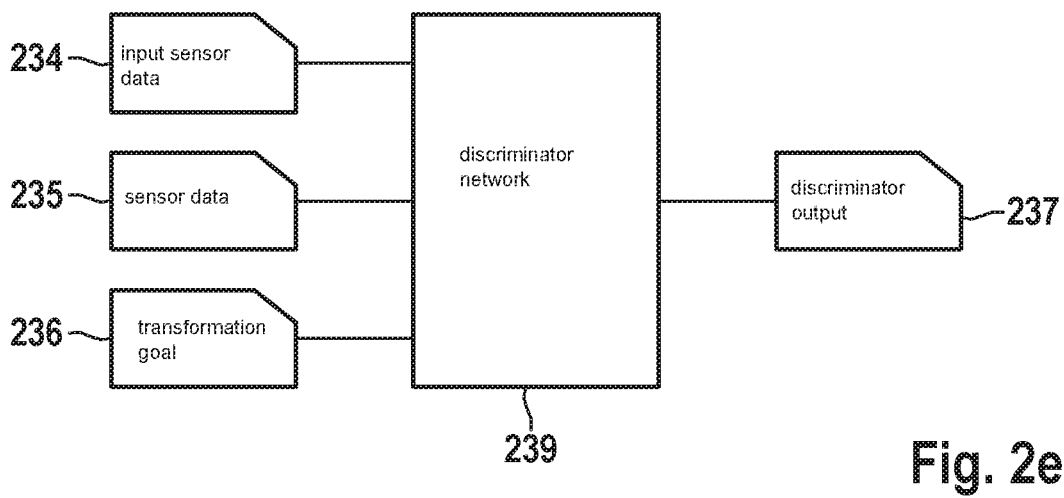
FIG. 2e schematically shows an example of an embodiment of a discriminator network.

FIG. 2e schematically shows an example of an embodiment of a discriminator network 239, e.g., as it may be used in system 200. Discriminator network 239 receives as input sensor data 234 and sensor data 235 and a transformation goal 236. Discriminator network 239 may be trained to discriminate if input sensor data 234 and sensor data 235 are both real, e.g., measured, and if they correspond to the transformation goal 236, i.e., if the change from sensor data 234 to 235 corresponds to the transformation indicated by the transformation goal.

For example, in case the transformation goal is a time-difference, discriminator network 239 may verify that sensor data 235 differs by the time-difference with sensor data 234. For example, the time-difference may be +4 hours, and the discriminator verifies if sensor data 235 was measured+4 hours later than sensor data 235. For example, the time-difference may be −4 hours, and the discriminator verifies if sensor data 235 was measured 4 hours earlier than sensor data 235. Discriminator output 237 may be a binary output.

Discriminator network 239 is particularly suited if the training data is predominantly paired. In particular, discriminator network 239 is well suited for training with still from video, or time-lapsed sensor data. For example, sensor data taken for an autonomous vehicle in the morning may be aged to appear as it were taken in the afternoon. The discriminator network may learn if the images are taken from the training set, e.g., are both real, and if their difference is of the indicated size. A difficult situation may be multiplied into many difficult situations.

Many types of neural networks are applicable for use in system 200 and 250. For example, FIG. 1 schematically shows an example of an embodiment of a generator neural network 100. Network 100 comprises three parts: an encoder part 120, a processing part 130 and a decoder part 140.

Encoder part 120 is configured to receive the input sensor data 151. Encoder part 120 may be configured with a so-called bottleneck at its output. Processor part 130 receives the output of the encoder part 120, decoder part 140 may receive the output of the processing part. The transformation goal 152 may be applied to one or more parts of the network. As shown in FIG. 1, the transformation goal 152 is provided as input 153 to the encoder part and as an input 154 to the processing part. Although not shown in FIG. 1, it was found to be particularly advantageous to supply the transformation goal could as an input to the decoder part 140.

In an example embodiment of the present invention, the transformation goal could be an input to the decoder part 140. In an embodiment, the transformation goal could be an input to the decoder part 140 and to the encoder part 130.

In an example embodiment of the present invention, encoder part 120 comprises multiple convolution layers, processor part 130 comprises multiple residual layers and the decoder part comprises multiple convolution layers. Various conventional types of layers may be added. For example, in an embodiment, encoder part 120 comprises 5 convolution layers, processor part 130 comprises 4 residual layers and the decoder part comprises 5 convolution layers. The network may be larger or smaller as desired, or may even be much larger.

The discriminator network may comprise multiple convolutional layers, e.g., 5 layers. At least one, but preferably more than one of the layers receive the transformation goal.

The generator network may be a conventional network, e.g., for example, for the generative network one may adapt the network described in "Perceptual losses for real-time style transfer and super-resolution" by J. Johnson, et al. However, an additional input is provided to one or more of its layers which comprises the transformation goal. For the discriminator network one may adapt a PatchGAN which aims to classify whether overlapping image patches, e.g., 70×70 patches, are real or fake. Also the PatchGan should be adapted to receive an additional input. The adapted generator and discriminator networks may be trained with a loss function according to an embodiment.

Any appropriate solver may be used to train the networks, e.g., one may use the Adam solver with a batch size of 1; see "ADAM: A method for stochastic optimization" by D. Kingma and J. Ba.

Figure 4A:
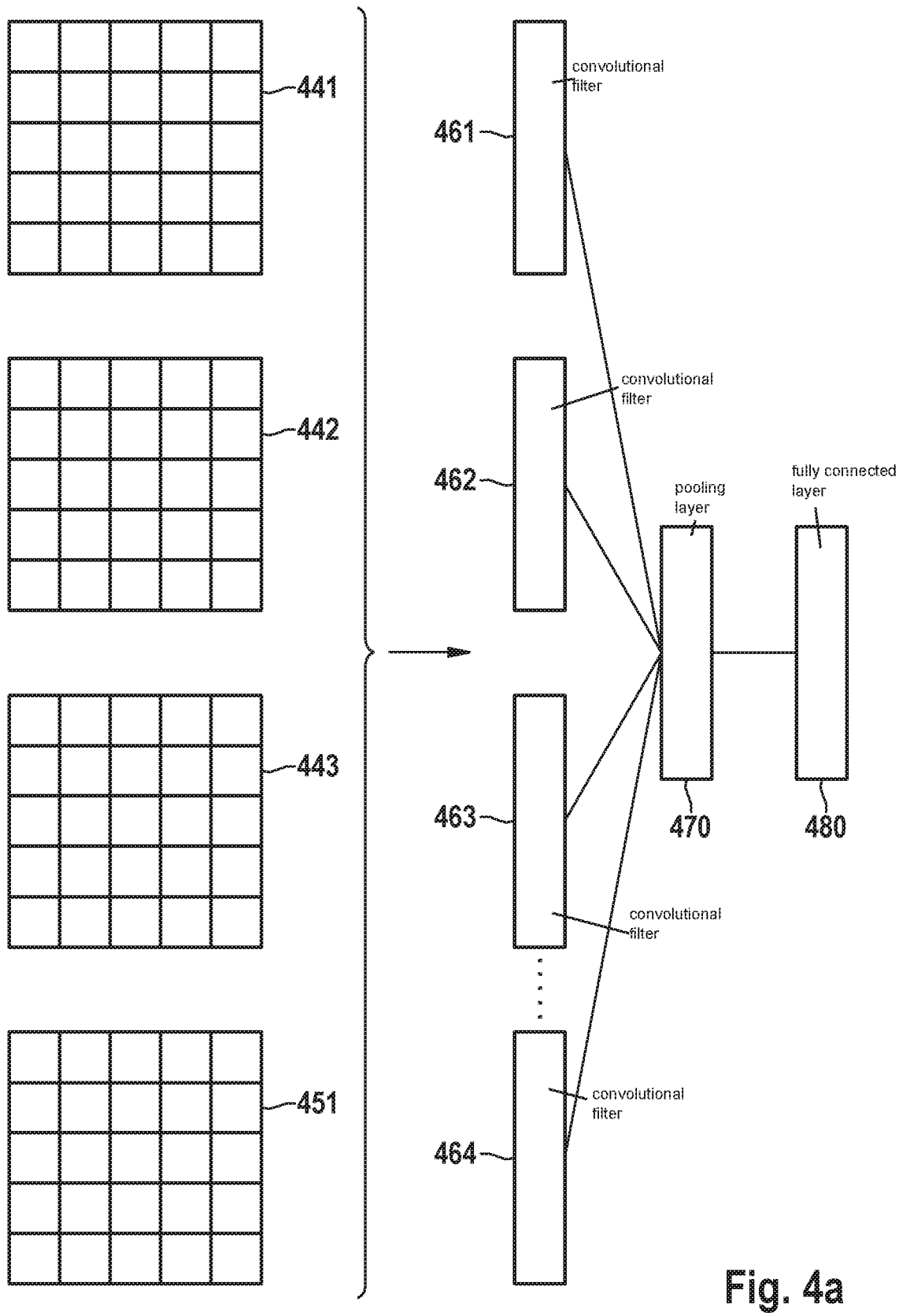
FIG. 4a schematically shows an example of an embodiment of a detail of a neural network.

FIG. 4a schematically shows an example of an embodiment of a detail of a neural network. FIG. 4a shows a number of convolutional filters, shown are convolutional filters 461-464, there may be more or fewer filters. The embodiments illustrated with FIG. 4a may be a part of a generator network and/or a discriminator network. FIG. 4a may be the input, e.g., to the first layer of the network, the part may also be an input to a later layer, in the latter case, there may be additional inputs, e.g., from the preceding network layer.

The convolutional filters take as input the sensor data. For example, the sensor data may comprise multiple channels. Shown are sensor data channels 441-443. For example, the sensor data channels 441-443 may represent different aspects of the sensor data. For example, the sensor data channels 441-443 may represent different color channels of an image, e.g., RGB channels. In this case, a further channel is added: transformation goal channel 451. The transformation goal encodes the transformation goal. For example, the transformation goal channel 451 may encode two transformation goals as an entirely black or white plane (e.g., entirely activated or de-activated). Multiple transformation goals may be encoded in the transformation goal channel 451, or may be encoded by adding multiple transformation goal channels. For example, in an embodiment, each transformation goal corresponds to a channel.

In an embodiment, multiple transformation goals may be encoded with a single transformation channel; for example, different values in the transformation channel may correspond to different transformation goals. For example, if there are 3 transformation goals, e.g. three domains, then the values for the domains may be {0, 0.5, 1}. Preferably, the range of the inputs, e.g., the sensor data inputs, e.g., a sensor data channel is the same as the range used for an input that encodes multiple transformation goals. For example, each transformation goal may be encoded as a discrete value, wherein the range of the discrete values is the same as the range of the sensor data inputs. For example, the min and max values are the same for a sensor data input x and for a transformation goal z. It was found that keeping the ranges equal improves the optimization. For example, the range for sensor data inputs and for transformation goal inputs may be the same interval, e.g., [0;1]. Other transformation goals than domains may be encoded in a similar value. For example, a time difference may be encoded as a value between 0 and 1, or as multiple values between 0 and 1. For example, a positive time difference may be encoded in a different channel than a negative time difference.

A convolution filter may stride across the input volume defined by the multiple channels. For example, a convolution filter may receive part of each channel as input to compute on of the convolution filter values in the output of the convolution filter. By striding the convolution filter multiple convolution filter values are obtained. The outputs of the convolution filters may be further processed by the rest of the network. For example, in this example, a pooling layer 470 is inserted after the convolutional layer, after which a fully connected layer 480 may be placed. These are only exemplifying as many alternatives for the network architecture are possible.

The convolutional filters 461-463 may be part of the first layer of the generator and/or discriminator network. Later layers may also receive the input image channel(s), the transformation goal channel(s) and channels obtained from previous layers. For example, it has turned out to be advantageous to supply the transformation goal channel(s) a decoding part of the generator network.

In this example embodiment, the generator network and/or the discriminator network are arranged to receive multiple channels as input, at least one of the channels encoding the sensor data and at least one of the channels encoding the transformation goal.

It is noted however, that the sensor data input does not necessarily have to be 2d information, or may include additional information beyond 2d information. For example, the sensor input may comprise, possibly in addition to 2d-type information, e.g., audio, 1-dimensional radar data. The sensor data may also comprise 3-d information, e.g., video or image with depth information for 3d, etc. The sensor data may comprise sensor data with a temporal component, e.g., audio or video information.

Furthermore, the transformation goal does not have to be supplied as a channel. Although the latter is convenient, the transformation goal may also be expressed, e.g., as bit vector.

Figure 4B:
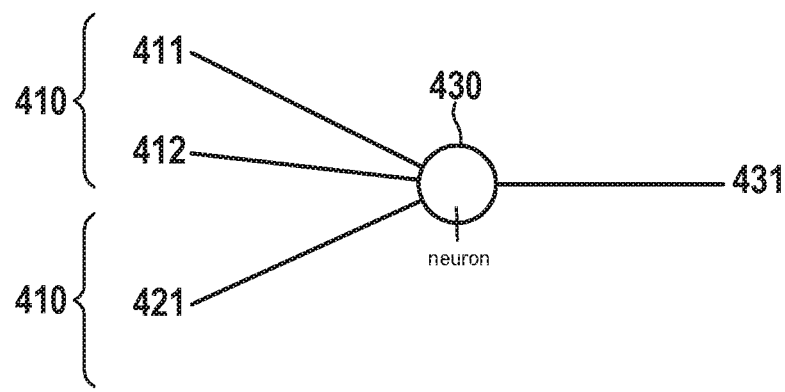
FIG. 4b schematically shows an example of an embodiment of a neuron.

FIG. 4b schematically shows an example of an embodiment of a neuron that may be part of an embodiment of the generator network and/or the discriminator network. FIG. 4b shows a neuron 430 that receives sensor data inputs 410, e.g., data items obtained from the sensor data input, and transformation goal inputs 420. For example, sensor data inputs 410 may comprise multiple sensor data items, shown are sensor data items 411-412. For example, sensor data item may be a single bit, e.g., a 0/1 value, e.g., representing a single bit of the sensor input, e.g., a value of a pixel, a value of an input channel, etc. For example, transformation goal inputs 420 may comprise one or more transformation goal items, shown is transformation goal item 421. For example, transformation goal item 421 may represent a single bit, e.g., a 0/1 value, e.g., representing a single bit of the transformation goal. For example, transformation goal item 421 may indicate a domain, or a time difference etc.

In an example embodiment of the present invention, the transformation goals correspond one-on-one to domain transformations. For example, sensor data may be labeled. A domain may be implicitly defined by the sensor data that has a particular label. A transformation may be defined as transforming an image so that it accords with the other images in the domain. In this example, the labels are discrete data and the transformations are also discrete. However, sensor data may instead or in addition be labeled with continuous label. An example of a continuous label is a timestamp. In case of continuous labels, one could still define domains and transformation as above. However, in an embodiment, a transformation goal can be defined as the difference between two labels. For example, a label may be outside temperature. The transformation goal may be to convert sensor data to a particular outside temperature, but instead a transformation goal may also be to convert the sensor data so that it corresponds with a temperature that is some amount higher or lower.

For example, the training data may be labeled with a timestamp, and the plurality of transformation goals may comprise a plurality of time differences. The generator network may be configured to transform sensor data from a first timestamp to a second timestamp according to the time difference, the discriminator network may be configured to receive as input a first sensor data, a second sensor data and a time difference and to determine if the first sensor data and the second sensor data satisfy the time difference.

Figure 3C:
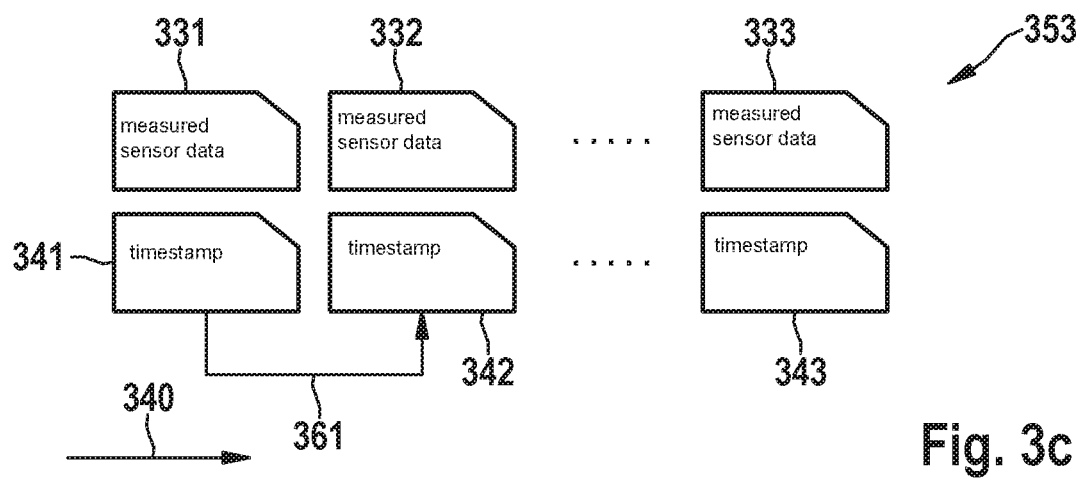
FIG. 3c schematically shows an example of an embodiment of a training set.

FIG. 3c schematically shows an example of an embodiment of a training set 353. Training set 353 comprises measured sensor data, shown are measured sensor data 331-333. Associated with measured sensor data is a timestamp, shown are timestamps 341-343. The timestamps increase in a time direction 340. Using the continuous the labels, the generator network may be trained to generate sensor data according to an increased or decreased timestamp. For example, given sensor data, the generator may be caused to generate an image with an increased timestamp, e.g., with an increase of time difference 361. Interestingly, in this case, it is known which image the system ought to generate, namely image 332. In other words the training data 353 may be used as paired training data. As discriminator network one may use discriminator 239.

In an example embodiment, the sensor data, e.g., sensor data 331-333 may comprise images from a time-lapse video labeled with a corresponding timestamp.

The generator network, e.g., in system 250, may be used for hallucinating possible past or future scenes conditioned on the current state at time. Generator G maybe used to fill in training data. For example, missing images in the sequence of sensor data may be filled in by aging near images. Here the job of the generator G is to synthesize the possible future (or past) state given the current sample $x_i$ and a desirable time state for prediction $\Delta t_i$, and the discriminator D needs to assess if the sample is real or generated ($x_{i+\Delta ti}$ or $x_{i+\Delta ti}'$) and if the given two samples $x_i$ and $X_{i+ti}$ (or $x_{i+\Delta ti}'$) have the temporal distance $\Delta t_i$.

$$L(G,D)=\Sigma_i(L_{GAN}(G,D,\Delta t_i)+\lambda_{domain}L_{domain}(G,D,\Delta t_i)+\lambda_{CYC}L_{CYC}(G,\Delta t_i)+\lambda_{identity}L_{identity}(G,\Delta t_i)+\lambda_{reconstr}L_{reconstr}(G,\Delta t_i)), \text{ where}$$

$x_i$ and $x_{i+\Delta ti}$ are two frames in the same video with temporal distance $\Delta t_i$, i=1, . . . ,N, N is the number of frames in the video sequence;

$$L_{GAN}(G,D,\Delta t_i)=E_{Pdata}[\log D(x_i,x_{i+\Delta ti},\Delta t_i)]+E_{Pdata}[\log(1-D(x_i,G(x_i,\Delta t_i),\Delta t_i))];$$

$$L_{domain}(G,D,\Delta t_i,\Delta t_j)=E_{Pdata}[\log(1-D(x_i,X_{i+\Delta ti},\Delta t_i))]+\lambda_{domain\_gen}E_{Pdata}[\log(1-D(x_i,G(x_i,\Delta t_i),\Delta t_j))];$$

$$L_{CYC}(G,\Delta t_i)=E_{Pdata}[\|G(G(x_i,\Delta t_i),-\Delta t_i)-x_i\|_1]+E_{pdata}[\|G(G(x_{i+\Delta ti},-\Delta t_i),\Delta t_i)-x_{i+\Delta ti}\|_1];$$

$$L_{reconstr}(G,\Delta t_i)=E_{pdata}[\|G(X_i,\Delta t_i)-x_{i+\Delta ti}\|_1],$$

samples are paired by default in the time series;

$$L_{identity}(G)=E_{pdata}[\|G(x_i,0)-x_i\|_1],$$

here identity loss is a special case of reconstruction when $\Delta t_i$=0.

In the various embodiments of system 200 and 250, the communication interfaces may be selected from various alternatives. For example, the interface may be a network interface to a local or wide area network, e.g., the Internet, a storage interface to an internal or external data storage, a keyboard, an application interface (API), etc.

The systems 200 and 250 may have a user interface, which may include conventional elements such as one or more buttons, a keyboard, display, touch screen, etc. The user interface may be arranged for accommodating user interaction for configuring a generator and discriminator networks, training the networks on a training set, or applying the generator network to new sensor data.

Storage may be implemented as an electronic memory, e.g., a flash memory, or magnetic memory, e.g., a hard disk or the like. Storage may comprise multiple discrete memories together making up storage 110. Storage may comprise a temporary memory, e.g., a RAM. The storage may be cloud storage.

System 200 may be implemented in a single device. System 250 may be implemented in a single device. Typically, the system 200 and 250 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 200 and 250 may comprise circuits for the evaluation of neural networks.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

A particularly advantageous application is the augmentation of training data for a further neural network, e.g., a different neural network than the generator network and discriminator network. For example, this may be applied to data that is used to train or test autonomous vehicles. For example, the system 200 may be trained on sensor data comprising sensor data of a vehicle, e.g., image data, radar data, etc. For example, the sensor data may represent the vicinity of the vehicle, e.g., as measured by one or more sensors comprised in the vehicle.

The transformation goal may comprise a time difference to generate sensor data according to a different time of day and/or of the year. For example, sensor data that was obtained during a test run in the morning may be artificially aged to appear as sensor data that was obtained in the afternoon or vice versa.

The transformation goal may comprise a type of environment of the vehicle. For example, sensor data for a rural setting may be obtained from an urban setting, etc.

The transformation goal may comprise a type of the sensor data. For example, image data may be transformed to radar data or vice versa, etc.

The transformation goal may comprise a color or model of cars. For example, red cars may be transformed to blue cars, or a SUV may be transformed to into a hatchback, etc.

When training systems of the autonomous vehicle, the generated afternoon data may be used possibly in addition to the morning data. The trained system may, e.g., be an object classifier. Accordingly, the new network will recognize a cyclist in the morning as well as in the afternoon, as well as in different landscapes. The augmented data may also be used to test the autonomous vehicle in the laboratory. Many types of transformations are possible and thus even a large amount of training data may be extended to a larger amount of training data. These transformations can be applied to any sensor data, not only to sensor data of a vehicle. The sensor data may be of another type of device, e.g., a robot arm, a power tool, etc.

Synthetic datasets may be obtained, e.g., simulation engines, that generate an arbitrary amount of training data in the desired target domain. This can include synthesis of so called corner cases, i.e., unlikely but important situations, for which it is otherwise difficult to obtain a sufficient amount of training data. In the application field of automated driving this may include dangerous situations, e.g., near accidents, or challenging weather or light conditions. Embodiments are particularly suited to model the entire variability in recorded training data, which can include, e.g., properties of the sensor, weather conditions, etc. GANs can also be used to generate specific training data for applications such as object detection, where hard positive or negative cases are needed to further improve an already well-working detector. The positive and negative cases may be modelled as two different domains.

The GAN can be used to enhance recorded data, by adding in features that were missing during recording, but are characteristic for the expected data distribution. This includes applications such as in-painting, e.g., filling in missing regions in an image, e.g., due to sensor defects, de-occlusion, e.g., when parts of an important object are hidden by another object and complicate classification, e.g., a pedestrian hidden behind a vehicle. It can also be used to turn manual drawings or label maps into realistic images, e.g., to construct specific corner cases. GANs may also be used to enhance the resolution of an image recorded with a lower-resolution sensor.

The above applications are not limited to images only, but can also be applied to image-like data such as spectrograms of sounds, radar spectra, ultrasound images, etc. and can thus be used to generate synthetic data for other domains, e.g., for speech synthesis. Embodiments can be conditioned on other sensor inputs or abstract features, and can thus be used for multi-sensory fusion as well, e.g., to do translation between different data modalities/sensors.

The example framework in accordance with the present invention can also be used for future state predictions, which is particularly important for autonomous agents to successfully operate in the real world, e.g., to anticipate the movements of pedestrians and vehicles for autonomous driving. The ability to anticipate future scene states which involves mapping one scene state to likely future states under uncertainty is a key competence for autonomous agents.

Figure 6A:
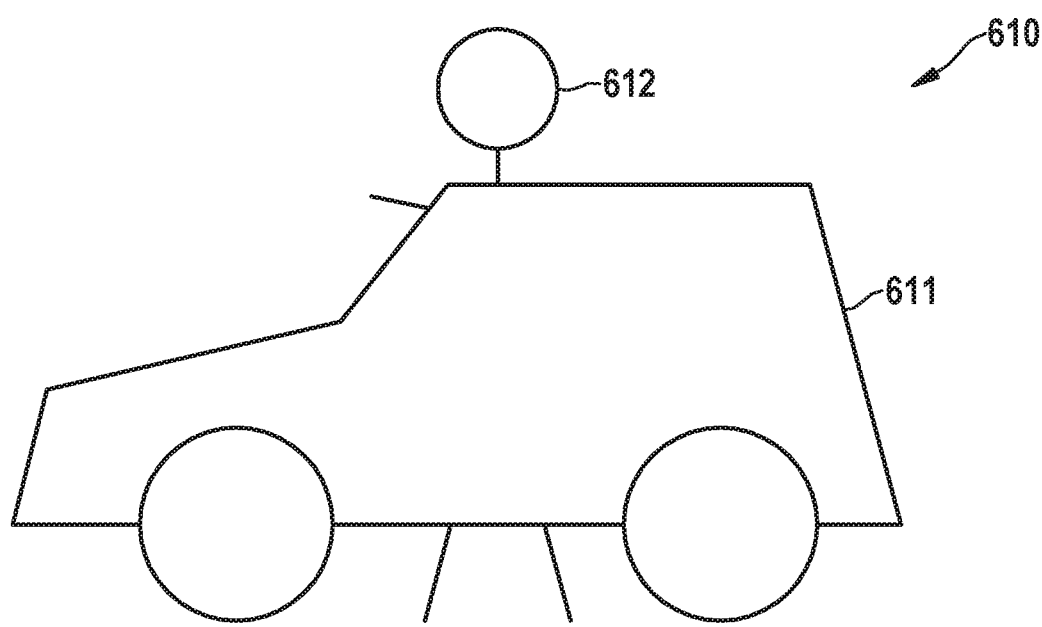
FIG. 6a schematically shows an example of an embodiment of measured sensor data.
Figure 6B:
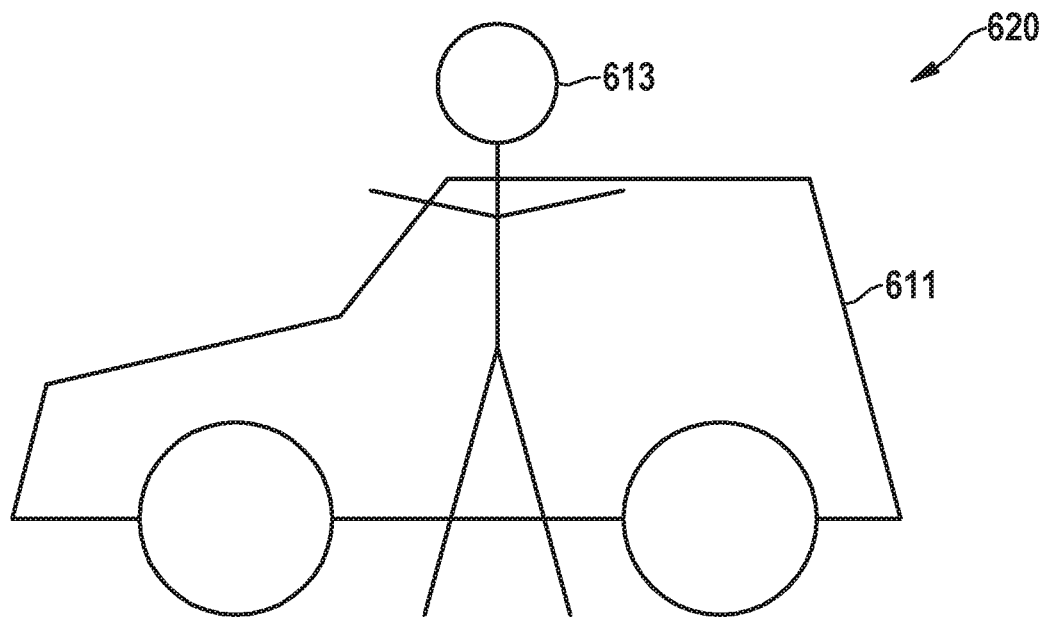
FIG. 6b schematically shows an example of an embodiment of generated sensor data.
Figure 6C:
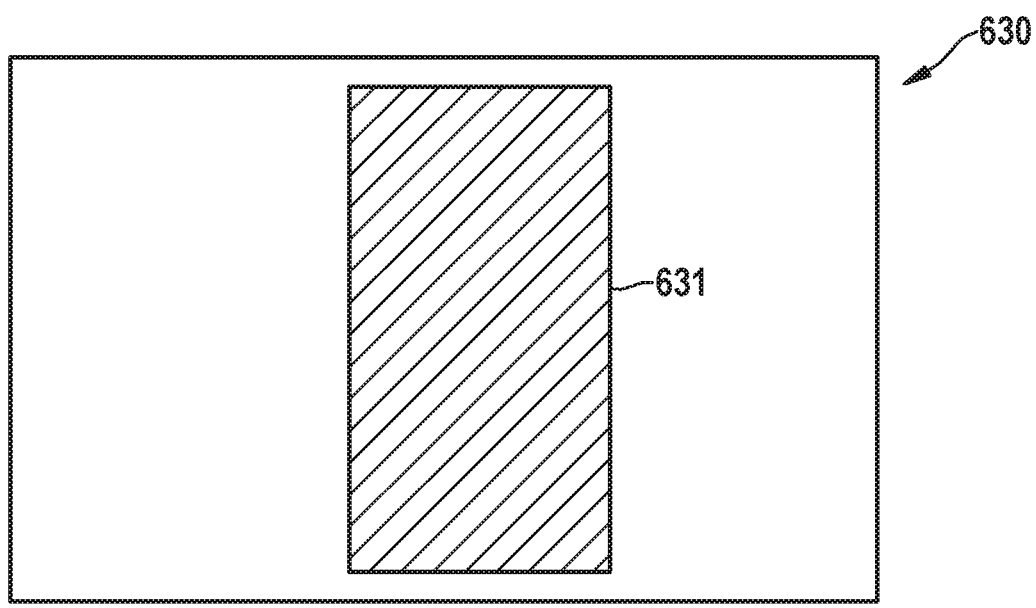
FIG. 6c schematically shows an example of an embodiment of a transformation goal.

A further application of embodiments is de-occlusion. For example, in an embodiment, the plurality of transformation goals comprises information indicating an object identified in the sensor data, and indication if the object is to be occluded or desoccluded. FIG. 6a schematically shows an example of an embodiment of measured sensor data. FIG. 6a shows a person behind, e.g., occluded, by a car. FIG. 6b shows the same scene but here the person is moved from behind the car to in-front of the car. Person is no longer occluded by the car, e.g., the person has been des-occluded. The des-occlusion operation may be performed by an embodiment of the generator network. For example, images 6a and 6b may be taken as the sensor data. The transformation goal, included whether to occlude or to des-occlude. For example, the transformation goal may be as in FIG. 6c. In this case, the black bar indicates that a person is to be deoccluded. For example, FIGS. 6a and 6c may be provided as input to the generator image which may be trained to produce image 6b in response. The generator network may be configured to perform the opposite transformation. For example, an image similar as FIG. 6c may be used, e.g., on a different channel, to indicate that the network is to occlude a person. Given this goal and image 6b the image of 6a may be generated. This embodiment also provides an example of an embodiment in which the number of transformation goals can be very large.

The discriminator network in this case may distinguish between real and generated images, and may verify that the person indicated by the black bar is indeed occluded or dis-occluded.

Figure 6D:
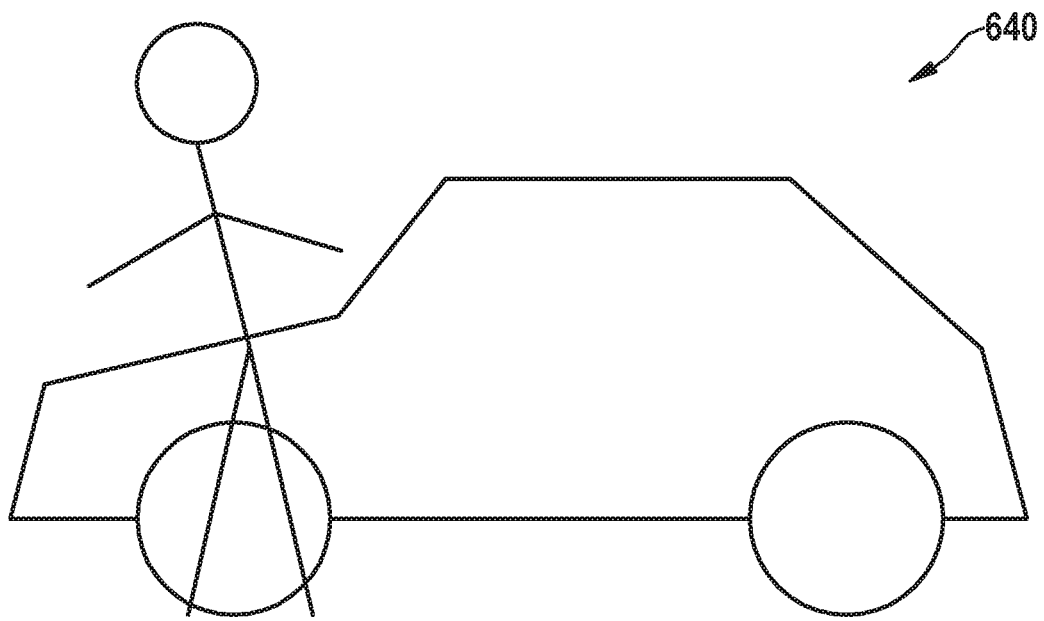
FIG. 6d schematically shows an example of an embodiment of measured sensor data.
Figure 6E:
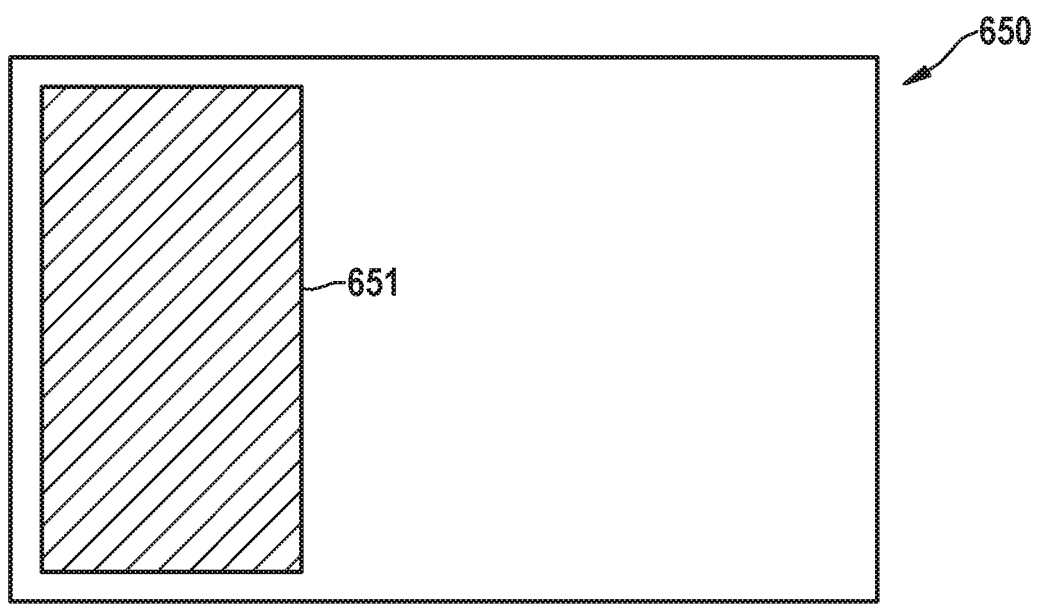
FIG. 6e schematically shows an example of an embodiment of a transformation goal.

The generator and discriminator networks maybe trained by unpaired data. For example, FIG. 6d schematically shows an example of an embodiment of measured sensor data, and FIG. 6e schematically shows an example of an embodiment of a transformation goal. The image of FIG. 6d and the transformation goal of FIG. 6e may be used as examples in the class of des-occluded persons. Similar situations with occluded persons may be used to define the class of occluded persons. The transformation goals may be generated automatically.

Automatically identifying occluded or des-occluded person is much easier than automatically occluding or des-occluding them. For example, the former may be obtained using a standard object classifier.

FIG. 7a schematically shows an example of an embodiment of a training method 700 configured for training a generator neural network arranged to transform measured sensor data into generated sensor data. Method 700 comprises accessing (710) a training set of measured sensor data,
    training (720) the generator network together with a discriminator neural network, comprising optimizing (730) the generator network to transform measured sensor data into generated sensor data, and optimizing (740) the discriminator network to distinguish between measured sensor data and generated sensor data, wherein the training comprises
    obtaining (750) as input sensor data and a transformation goal selected from a plurality of transformation goals and transforming (760) the sensor data according to the transformation goal using the generator network, and
    obtaining (770) as input sensor data and a transformation goal selected from the plurality of transformation goals and determining (780) if the sensor data is measured sensor data satisfying the transformation goal using the discriminator network.

FIG. 7b schematically shows an example of an embodiment of a generator method 800 arranged to transform measured sensor data into generated sensor data. Method 800 comprises receiving (810) as input measured sensor data and a transformation goal,
    applying (820) a trained generator network to the received input measured sensor data and the transformation goal, wherein the generator network has been trained according to an embodiment.

Many different ways of executing the method are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. For example, most of the training may be executed, at least partially, in parallel. Moreover, a given step may not have finished completely before a next step is started.

Embodiments of the method may be executed using software, which comprises instructions for causing a processor system to perform method 700 Or 800. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the present invention also extends to computer programs, particularly computer programs on or in a carrier, adapted for putting the present invention into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 8A:
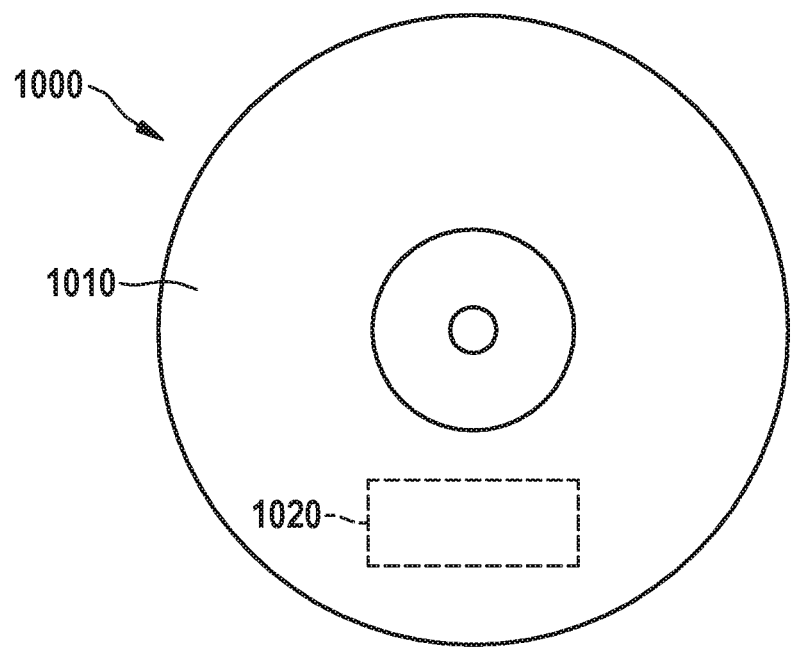
FIG. 8a schematically shows a computer readable medium having a writable part comprising a computer program according to an embodiment.

FIG. 8a shows a computer readable medium 1000 having a writable part 1010 comprising a computer program 1020, the computer program 1020 comprising instructions for causing a processor system to perform a training or generating method, according to an embodiment. The computer program 1020 may be embodied on the computer readable medium 1000 as physical marks or by means of magnetization of the computer readable medium 1000. However, any other suitable embodiment is possible as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said training or generating method.

Figure 8B:
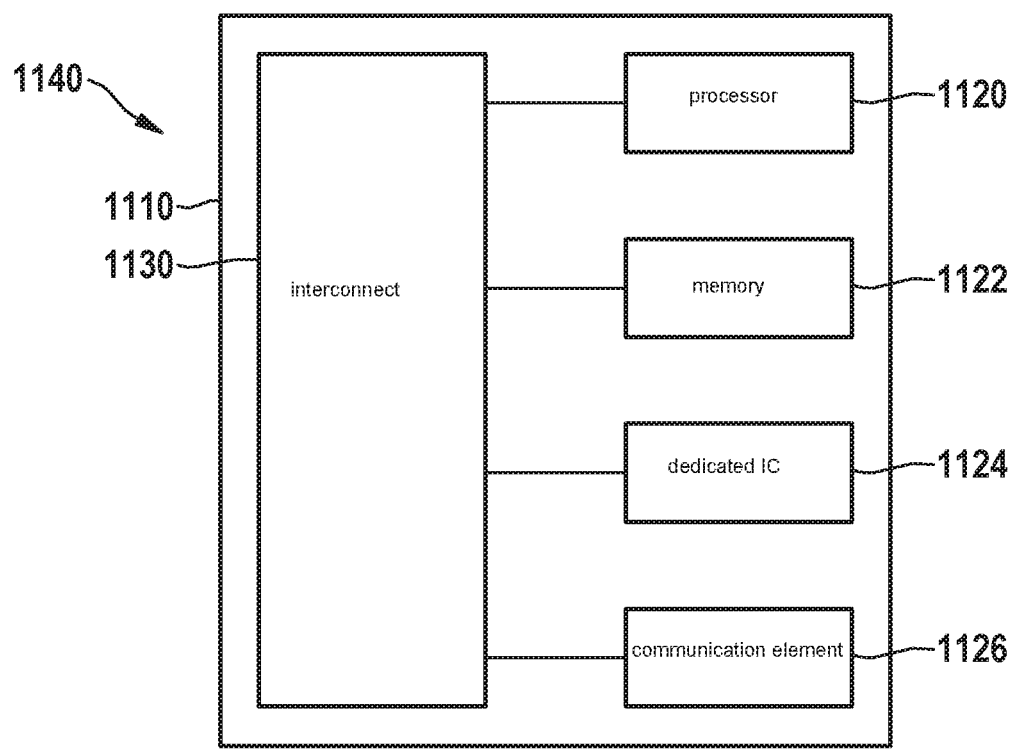
FIG. 8b schematically shows a representation of a processor system according to an embodiment.

FIG. 8b shows in a schematic representation of a processor system 1140 according to an embodiment of a training system and/or a generating system. The processor system comprises one or more integrated circuits 1110. The architecture of the one or more integrated circuits 1110 is schematically shown in FIG. 8b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, e.g., a bus. The processor system 1110 may be arranged for contact and/or contact-less communication, using an antenna and/or connectors, respectively.

For example, in an example embodiment, processor system 1140, e.g., an embodiment of a training system and/or a generating system, may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory.

It should be noted that the above-mentioned embodiments illustrate rather than limit the present invention, and that those skilled in the art will be able to design many alternative embodiments.

Herein, use of the verb 'comprise' and its conjugations does not exclude the presence of elements or steps other than those stated. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The present invention may be implemented by means of hardware comprising several distinct elements, and by means of a suitably programmed computer. In the device including several elements, several of these elements may be embodied by one and the same item of hardware. The mere fact that certain measures are described mutually separately does not indicate that a combination of these measures cannot be used to advantage.

What is claimed is:

1. A training system for training a generator neural network arranged to transform measured sensor data into generated sensor data, the system comprising:
   a communication interface for accessing a training set of measured sensor data; and
   a processor system configured to train the generator network together with a discriminator neural network, wherein the generator network is optimized to transform the measured sensor data into generated sensor data, and the discriminator network is optimized to distinguish between the measured sensor data and the generated sensor data;
   wherein the generator network is configured to receive, as input, the measured sensor data and a transformation goal selected from a plurality of transformation goals and is configured to transform the measured sensor data it received as input into the generated sensor data according to the transformation goal it received as input, wherein the discriminator network is configured to receive, as input, sensor data and a transformation goal selected from the plurality of transformation goals and to determine if the sensor data it received as input is measured sensor data satisfying the transformation goal.

2. The system as recited in claim 1, wherein: (i) the plurality of transformation goals include a plurality of domains, the training data being labeled with a domain of the plurality of domains, the generator network being configured to transform the sensor data it received as input to a domain according to the transformation goal, the discriminator network being configured to determine if the sensor data it received as input satisfies the domain according to the transformation goal, or (ii) the plurality of transformation goals include a plurality of time differences, the training data being labeled with a timestamp, the generator network being configured to transform the sensor data it received as input from a first timestamp to a second timestamp according to the time difference, the discriminator network being configured to receive as input a first sensor data, a second sensor data and a time difference and to determine if the first sensor data and the second sensor data satisfy the time difference.

3. The system as recited in claim 1, wherein the discriminator network is trained to determine that the sensor data it received as input and the transformation goal it received as input are according to the training set.

4. The system as recited in claim 1, wherein the training set includes one or more sets of a first measured sensor data, a first transformation goal and second measured sensor data, the generator network being trained to transform the first measured sensor data into the second measured sensor data according to the first transformation goal.

5. The system as recited in claim 1, wherein the training set comprises images from a time-lapse video labeled with a corresponding timestamp.

6. The system as recited in claim 1, wherein the plurality of transformation goals includes information indicating an object identified in the sensor data, and indication if the object is to be occluded or desoccluded.

7. The system as recited in claim 1, wherein the plurality of transformation goals include at least one multiple of transformation goals such that sequentially transforming measured sensor data according to the multiple of transformation goals defines an identity transformation.

8. A training system for training multiple separate generator neural networks each arranged to transform measured sensor data into generated sensor data, the system comprising:
   a communication interface for accessing a training set of measured sensor data; and
   a processor system arranged to train the multiple generator networks together with a discriminator neural network, wherein the generator networks are optimized to transform measured sensor data into generated sensor data, and the discriminator network is optimized to distinguish between the measured sensor data and the generated sensor data;
   wherein each one of the multiple generator networks is associated with a respective transformation goal, and arranged to receive, as input, sensor data and to transform the sensor data it received as input according to the respective transformation goal; and
   wherein the discriminator network is arranged to receive, as input, sensor data and a transformation goal selected from the plurality of transformation goals and to determine if the sensor data it received as input is measured sensor data satisfying the transformation goal it received as input.

9. A generator system for a generator neural network arranged to transform measured sensor data into generated sensor data, the system comprising:
   a communication interface for receiving, as input, measured sensor data and a transformation goal; and
   a processor system configured to apply a trained generator network to the received input measured sensor data and the received transformation goal;
   wherein the generator network is trained by a training system, the training system including a second communication interface for accessing a training set of measured sensor data, and a second processor system configured to train the generator network together with a discriminator neural network, wherein the generator network is optimized to transform the measured sensor data into generated sensor data, and the discriminator network is optimized to distinguish between the measured sensor data and the generated sensor data, wherein the generator network is configured to receive, as input, the measured sensor data and a transformation goal selected from a plurality of transformation goals and is configured to transform the measured sensor data it received as input into the generated sensor data according to the transformation goal it received as input, wherein the discriminator network is configured to receive, as input, sensor data and a transformation goal selected from the plurality of transformation goals and to determine if the sensor data it received as input is measured sensor data satisfying the transformation goal.

10. A training method for training a generator neural network arranged to transform measured sensor data into generated sensor data, the method comprising the following steps:
    accessing a training set of measured sensor data;
    training the generator network together with a discriminator neural network, including optimizing the generator network to transform the measured sensor data into generated sensor data, and optimizing the discriminator network to distinguish between the measured sensor data and the generated sensor data, wherein the training includes obtaining, as input, the measured sensor data and a transformation goal selected from a plurality of transformation goals and transforming the measured input sensor data into the generated sensor data according to the input transformation goal using the generator network, wherein the discriminator network is configured to receive, as input, sensor data and a transformation goal selected from the plurality of transformation goals and to determine if the sensor data it received as input is measured sensor data satisfying the transformation goal.

11. The method as recited in claim 10, further comprising the following steps:
    obtaining, as further input, additional sensor data and an additional transformation goal selected from the plurality of transformation goals; and
    determining if the additional sensor data is measured sensor data satisfying the additional transformation goal using the discriminator network.

12. A generator method for a generator neural network arranged to transform measured sensor data into generated sensor data, the method comprising the following steps:
    receiving, as input, measured sensor data and a transformation goal; and applying a trained generator network to the received input measured sensor data and the received transformation goal;

wherein the generator network has been trained by:
accessing a training set of measured sensor data;
training the generator network together with a discriminator neural network, including optimizing the generator network to transform the measured sensor data into generated sensor data, and optimizing the discriminator network to distinguish between the measured sensor data and the generated sensor data, wherein the training includes obtaining, as input, the measured sensor data and a transformation goal selected from a plurality of transformation goals and transforming the measured input sensor data into the generated sensor data according to the input transformation goal using the generator network, wherein the discriminator network is configured to receive, as input, sensor data and a transformation goal selected from the plurality of transformation goals and to determine if the sensor data it received as input is measured sensor data satisfying the transformation goal.

13. A non-transitory computer readable medium on which is stored data representing instructions for training a generator neural network arranged to transform measured sensor data into generated sensor data, the data, when executed by a computer, causing the computer to perform the following steps:

accessing a training set of measured sensor data; and
training the generator network together with a discriminator neural network, including optimizing the generator network to transform the measured sensor data into generated sensor data, and optimizing the discriminator network to distinguish between the measured sensor data and the generated sensor data, wherein the training includes obtaining, as input, the measured sensor data and a transformation goal selected from a plurality of transformation goals and transforming the measured input sensor data into the generated data according to the input transformation goal using the generator network, wherein the discriminator network is configured to receive, as input, sensor data and a transformation goal selected from the plurality of transformation goals and to determine if the sensor data it received as input is measured sensor data satisfying the transformation goal.

14. A non-transitory computer readable medium on which is stored data representing instructions for a generator neural network arranged to transform measured sensor data into generated sensor data, the data, when executed by a computer, causing the computer to perform the following steps:

receiving, as input, measured sensor data and a transformation goal; and applying a trained generator network to the received input measured sensor data and the received transformation goal;

wherein the generator network has been trained by:
accessing a training set of measured sensor data; and
training the generator network together with a discriminator neural network, including optimizing the generator network to transform the measured sensor data into generated sensor data, and optimizing the discriminator network to distinguish between the measured sensor data and the generated sensor data, wherein the training includes obtaining, as input, the measured sensor data and a transformation goal selected from a plurality of transformation goals and transforming the measured input sensor data into the generated sensor data according to the input transformation goal using the generator network, wherein the discriminator network is configured to receive, as input, sensor data and a transformation goal selected from the plurality of transformation goals and to determine if the sensor data it received as input is measured sensor data satisfying the transformation goal.

15. A training system for training a generator neural network arranged to transform measured sensor data into generated sensor data, the system comprising:

a communication interface for accessing a training set of measured sensor data; and
a processor system configured to train the generator network together with a discriminator neural network, wherein the generator network is optimized to transform the measured sensor data into generated sensor data, and the discriminator network is optimized to distinguish between the measured sensor data and the generated sensor data;
wherein the generator network is configured to receive, as input, the measured sensor data and a transformation goal selected from a plurality of transformation goals and is configured to transform the measured sensor data it received as input into the generated sensor data according to the transformation goal it received as input, and wherein the plurality of transformation goals include a plurality of time differences, the training data being labeled with a timestamp, the generator network being configured to transform the sensor data it received as input from a first timestamp to a second timestamp according to the time difference, the discriminator network being configured to receive as input a first sensor data, a second sensor data and a time difference and to determine if the first sensor data and the second sensor data satisfy the time difference.

* * * * *